United States Patent
Park et al.

(10) Patent No.: US 11,070,797 B2
(45) Date of Patent: Jul. 20, 2021

(54) IMAGE DECODING METHOD AND APPARATUS BASED ON INTER PREDICTION IN IMAGE CODING SYSTEM

(71) Applicant: LG ELECTRONICS INC., Seoul (KR)

(72) Inventors: Naeri Park, Seoul (KR); Junghak Nam, Seoul (KR); Jungdong Seo, Seoul (KR); Jaeho Lee, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/766,982

(22) PCT Filed: Nov. 27, 2018

(86) PCT No.: PCT/KR2018/014661
§ 371 (c)(1),
(2) Date: May 26, 2020

(87) PCT Pub. No.: WO2019/103564
PCT Pub. Date: May 31, 2019

(65) Prior Publication Data
US 2021/0037238 A1 Feb. 4, 2021

Related U.S. Application Data

(60) Provisional application No. 62/590,658, filed on Nov. 27, 2017.

(30) Foreign Application Priority Data

Mar. 30, 2018 (KR) .................. 10-2018-0037530
Mar. 30, 2018 (KR) .................. 10-2018-0037543

(51) Int. Cl.
*H04N 7/18* (2006.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/182* (2014.11)

(58) Field of Classification Search
CPC .. H04N 19/105; H04N 19/159; H04N 19/176; H04N 19/182
(Continued)

(56) References Cited

U.S. PATENT DOCUMENTS

2012/0263235 A1* 10/2012 Sugio ............... H04N 19/52
375/240.16
2015/0271516 A1* 9/2015 Arimura ............ H04N 19/105
375/240.16
(Continued)

FOREIGN PATENT DOCUMENTS

KR 10-2016-0106617 A 9/2016
KR 10-2017-0008848 A 1/2017
(Continued)

OTHER PUBLICATIONS

Hong et al, New Merge Mode Decision in High Efficiency Video Coding (HEVC) (Year: 2014).*

*Primary Examiner* — Shan E Elahi
(74) *Attorney, Agent, or Firm* — Dentons US LLP

(57) ABSTRACT

An image decoding method that is performed by a decoding apparatus according to the present disclosure comprises the steps of: forming a merge candidate list based on neighbouring blocks of a current block; deriving costs with respect to merge candidates included in the merge candidate list; deriving a revised merge candidate list based on the
(Continued)

costs with respect to the merge candidates; deriving movement information of the current block based on the revised merge candidate list; and performing prediction on the current block based on the movement information, wherein the neighbouring blocks include spatial neighbouring blocks and temporal neighbouring blocks.

15 Claims, 26 Drawing Sheets

(51) Int. Cl.
    *H04N 19/159*     (2014.01)
    *H04N 19/176*     (2014.01)
    *H04N 19/182*     (2014.01)

(58) Field of Classification Search
    USPC .................................................. 375/240.12
    See application file for complete search history.

(56) References Cited

U.S. PATENT DOCUMENTS

| | | | | |
|---|---|---|---|---|
| 2017/0019680 | A1* | 1/2017 | Lee | H04N 19/52 |
| 2019/0182489 | A1* | 6/2019 | Xu | H04N 19/176 |
| 2019/0261018 | A1* | 8/2019 | Bordes | H04N 19/31 |
| 2019/0281303 | A1* | 9/2019 | Xu | H04N 19/156 |

FOREIGN PATENT DOCUMENTS

| | | | | |
|---|---|---|---|---|
| KR | 10-2017-0102844 A | | 9/2017 | |
| WO | WO-2016183224 A1 | * | 11/2016 | ............. H04N 19/42 |
| WO | 2017/157281 A1 | | 9/2017 | |
| WO | 2017/010073 A1 | | 4/2018 | |

\* cited by examiner

FIG. 8
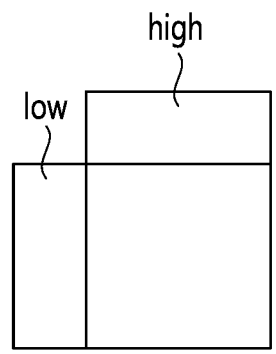 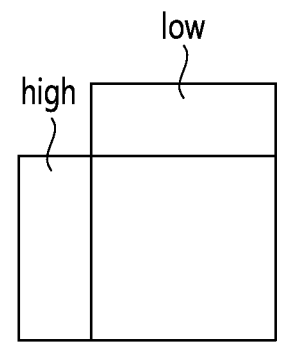
(a)
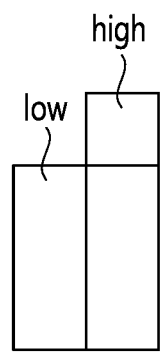 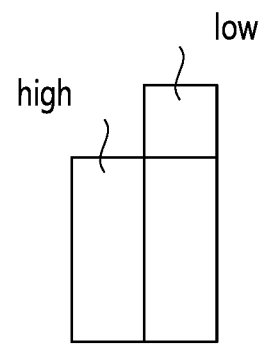
(b)
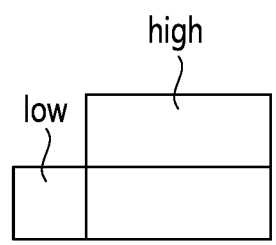 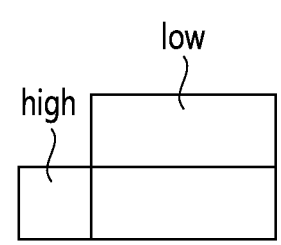
(c)
Neighbor-Left                    Neighbor-Above

FIG. 9
INCLUDING HIGH COST REGION  INCLUDING LOW COST REGION
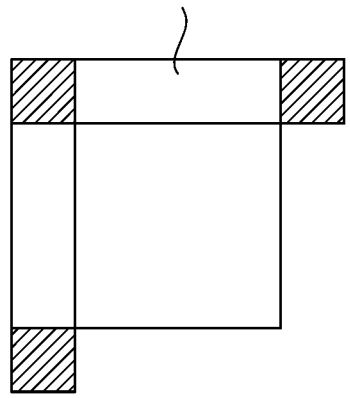
(A0, B0, B2)
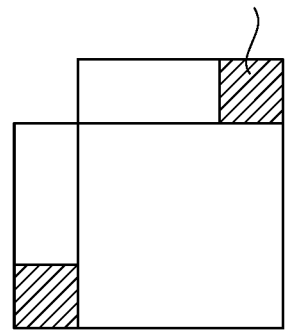
(A1, B1)
(a)
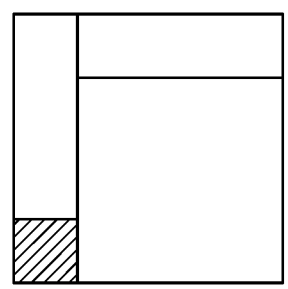
(A1)
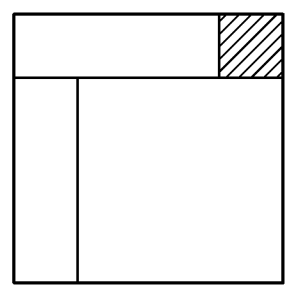
(B1)
(b)

IMAGE DECODING METHOD AND APPARATUS BASED ON INTER PREDICTION IN IMAGE CODING SYSTEM

This application is the National Stage filing under 35 U.S.C. 371 of International Application No. PCT/KR2018/014661, filed on Nov. 27, 2018, which claims the benefit of U.S. Provisional Application No. 62/590,658, filed on Nov. 27, 2017, Korean Patent Application No. 10-2018-0037530, filed on Mar. 30, 2018, and Korean Patent Application No. 10-2018-0037543, filed on Mar. 30, 2018, the contents of which are all hereby incorporated by reference herein in their entirety.

BACKGROUND OF THE DISCLOSURE

Field of the Disclosure

The present disclosure relates to an image coding technology, and more particularly, to an image decoding method and a device therefor in an image coding system according to inter-prediction.

Related Art

Demand for high-resolution, high-quality images such High Definition (HD) images and Ultra High Definition (UHD) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

A technical problem to be addressed by the present disclosure lies in providing a method and a device which increase image coding efficiency.

A technical problem to be addressed by the present disclosure lies in providing an image decoding method and an image decoding device which derive a cost for a merge candidate, derive a modified merge candidate list by reordering a merge candidate list based on the cost, and perform prediction on the current block based on the modified merge candidate list.

A technical problem to be addressed by the present disclosure lies in providing an image decoding method and an image decoding device which perform prediction on the current block based on a merge candidate list to which a refine merge candidate derived by performing a refinement process on a merge candidate is added.

According to an exemplary embodiment of the present disclosure, there is provided an image decoding method which is performed by a decoding device. The method includes constructing a merge candidate list based on a neighboring block of a current block, deriving costs for merge candidates included in the merge candidate list, deriving a modified merge candidate list based on the costs for the merge candidates, deriving motion information of the current block based on the modified merge candidate list, and performing prediction of the current block based on the motion information, wherein the neighboring block includes a spatial neighboring block and a temporal neighboring block.

According to another example of the present disclosure, there is provided a decoding device performing image decoding. The decoding device includes an entropy decoder obtaining information on inter-prediction of a current block through a bitstream, and a predictor which constructs a merge candidate list based on a neighboring block of the current block, derives costs for merge candidates included in the merge candidate list, derives a modified merge candidate list based on the costs for the merge candidates, derives motion information of the current block based on the modified merge candidate list and a merge index, and performs prediction of the current block based on the motion information, wherein the neighboring block includes a spatial neighboring block and a temporal neighboring block, and the information on inter prediction includes the merge index.

According to still another embodiment of the present disclosure, there is provided a video encoding method which is performed by an encoding device. The method includes constructing a merge candidate list based on a neighboring block of a current block, deriving costs for merge candidates included in the merge candidate list, deriving a modified merge candidate list based on the costs for the merge candidates, determining motion information of the current block based on the modified merge candidate list, performing prediction of the current block based on the motion information, and encoding information on inter prediction of the current block, wherein the neighboring block includes a spatial neighboring block and a temporal neighboring block, and the information on inter prediction includes the merge index.

According to still another example of the present disclosure, there is provided a video encoding device. The encoding device includes a predictor which constructs a merge candidate list based on a neighboring block of a current block, derives costs for merge candidates included in the merge candidate list, derives a modified merge candidate list based on the costs for the merge candidates, derives motion information of the current block based on the modified merge candidate list, and performs prediction of the current block based on the motion information, and an entropy encoder which encodes information on inter-prediction of the current block, wherein the neighboring block includes a spatial neighboring block and a temporal neighboring block, and the information on inter prediction includes the merge index.

According to the present disclosure, taking a cost into consideration, optimal merge candidates for the current block may be reordered in an order from small to large values of merge indexes, through which it is possible to reduce a bit amount and improve an overall coding efficiency.

According to the present disclosure, a refine merge candidate, which is an optimal merge candidate, can be derived based on a merge candidate of a current block, through which it is possible to improve prediction accuracy and efficiency, and improve an overall coding efficiency.

According to the present disclosure, a merge candidate list for a current block, which has been more efficiently modified by taking characteristics of the current block into consideration, can be derived, through which it is possible to improve prediction accuracy and prediction efficiency, and improve an overall coding efficiency.

BRIEF DESCRIPTION OF THE DRAWINGS

FIG. 8 illustratively represents costs according to a position and a size of a template.

FIG. 9 illustratively represents a template for a merge candidate.

DESCRIPTION OF EXEMPLARY EMBODIMENTS

Figure 1:
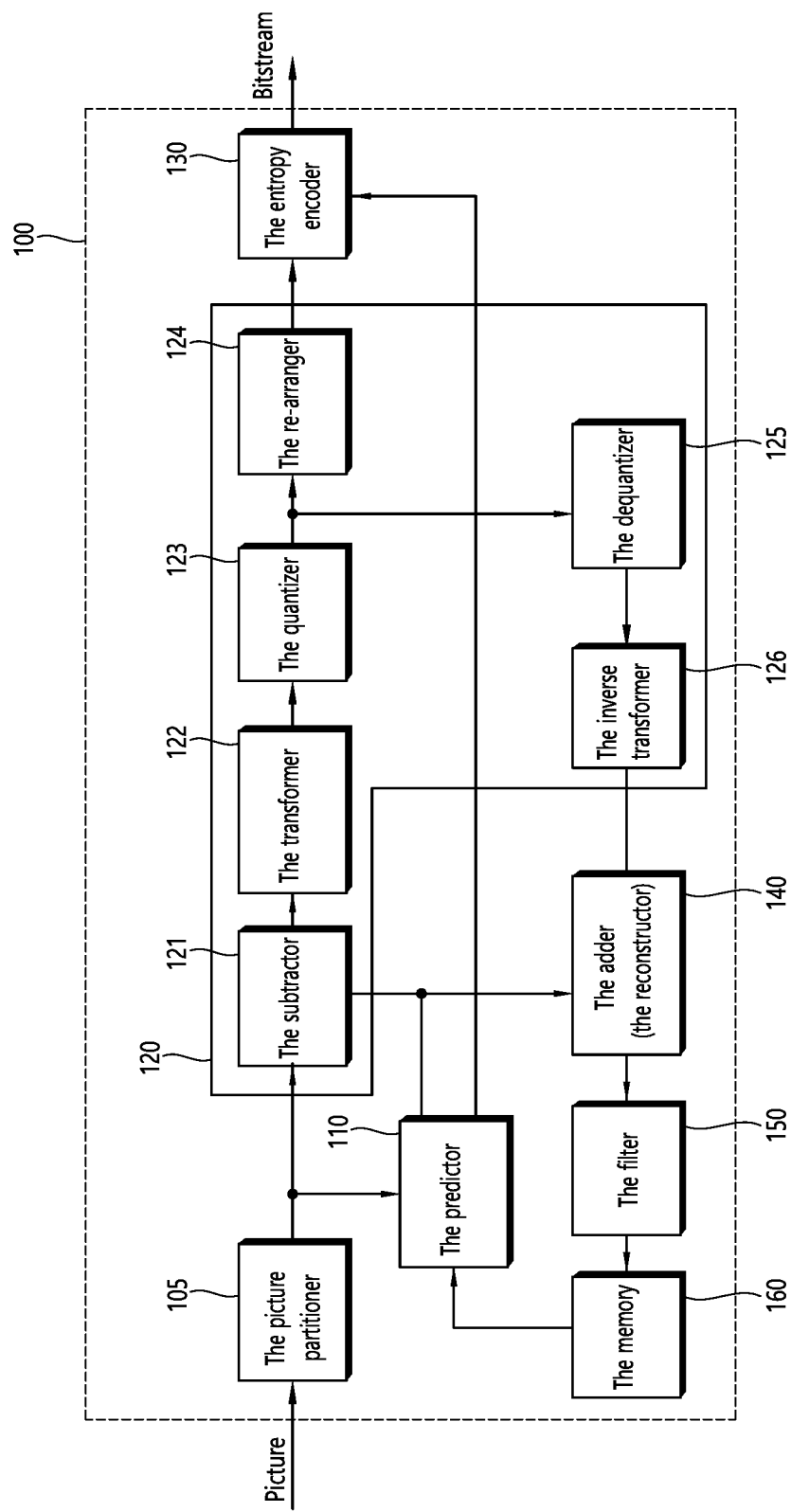
FIG. 1 is a schematic diagram illustrating a configuration of a video encoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a schematic diagram illustrating a configuration of a video encoding device to which the present disclosure is applicable.

Referring to FIG. 1, a video encoding device (100) may include a picture partitioner (105), a predictor (110), a residual processor (120), an entropy encoder (130), an adder (140), a filter (150), and a memory (160). The residual processor (120) may include a subtractor (121), a transformer (122), a quantizer (123), a re-arranger (124), a dequantizer (125), an inverse transformer (126).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including prediction samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

In case of the intra-prediction, the predictor (110) may derive a prediction sample for the current block based on a reference sample outside the current block in a picture to which the current block belongs (hereinafter, a current picture). In this case, the predictor (110) may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor (110) may determine the prediction mode to be applied to the current block by using the prediction mode applied to the neighboring block.

In case of the inter-prediction, the predictor (110) may derive the prediction sample for the current block based on a sample specified by a motion vector on a reference picture. The predictor (110) may derive the prediction sample for the current block by applying any one of a skip mode, a merge mode, and a motion vector prediction (MVP) mode. In case of the skip mode and the merge mode, the predictor (110) may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor (121) generates a residual sample which is a difference between an original sample and a prediction sample. If the skip mode is applied, the residual sample may not be generated as described above.

The transformer (122) transforms residual samples in units of a transform block to generate a transform coefficient. The transformer (122) may perform transformation based on the size of a corresponding transform block and a prediction mode applied to a coding block or prediction block spatially overlapping with the transform block. For example, residual samples can be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (123) may quantize the transform coefficients to generate quantized transform coefficients.

The re-arranger (124) rearranges quantized transform coefficients. The re-arranger (124) may rearrange the quantized transform coefficients in the form of a block into a one-dimensional vector through a coefficient scanning method. Although the re-arranger (124) is described as a separate component, the re-arranger (124) may be a part of the quantizer (123).

The entropy encoder (130) may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (130) may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer (125) dequantizes values (transform coefficients) quantized by the quantizer (123) and the inverse transformer (126) inversely transforms values dequantized by the dequantizer (125) to generate a residual sample.

The adder (140) adds a residual sample to a prediction sample to reconstruct a picture. The residual sample may be added to the prediction sample in units of a block to generate a reconstructed block. Although the adder (140) is described as a separate component, the adder (140) may be a part of the predictor (110). Meanwhile, the adder (140) may be referred to as a reconstructor or reconstructed block generator.

The filter (150) may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter (150) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (150). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

Figure 2:
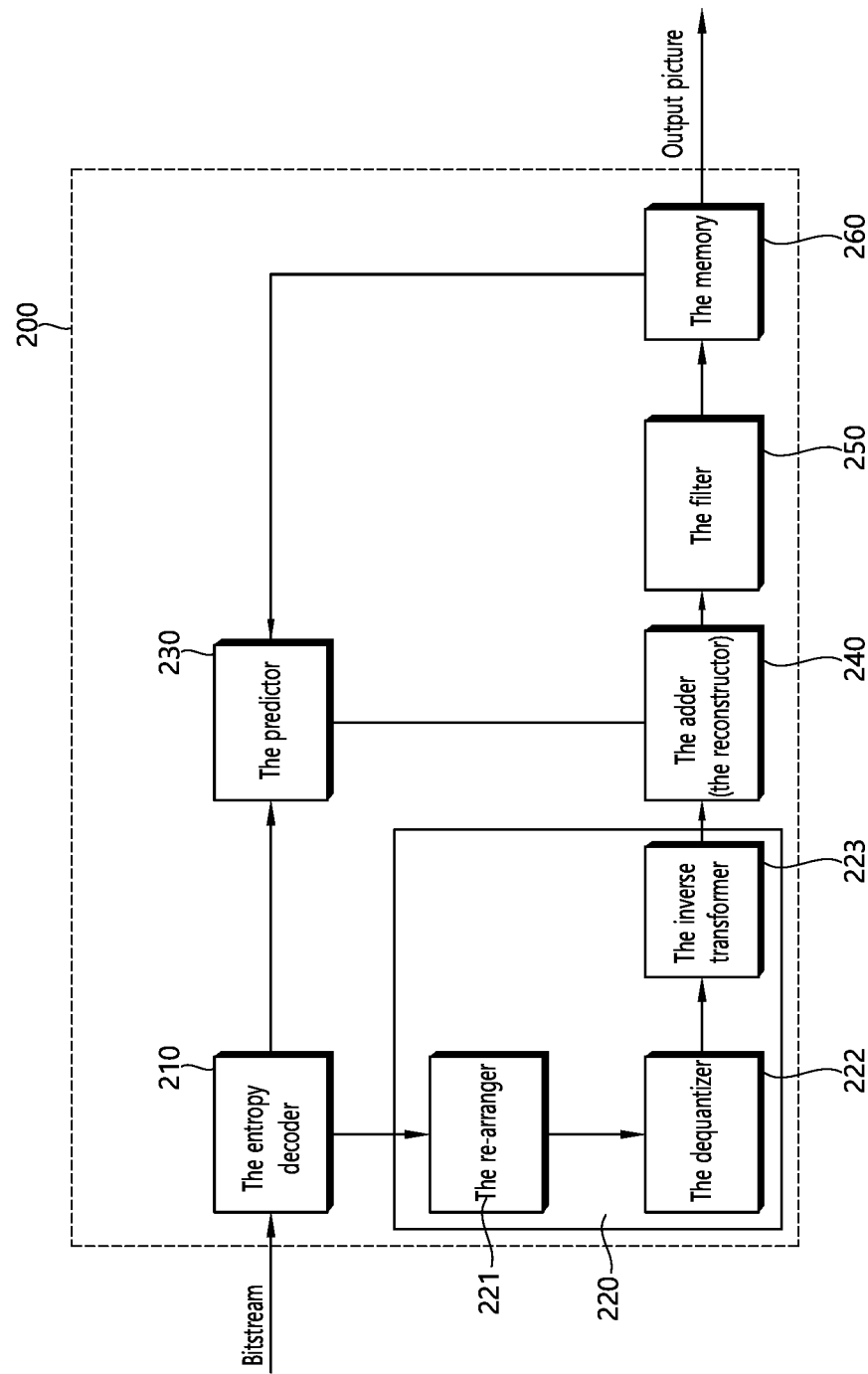
FIG. 2 is a schematic diagram illustrating a configuration of a video decoding apparatus to which the present disclosure is applicable.

FIG. 2 is a schematic diagram illustrating a configuration of a video decoding device to which the present disclosure is applicable.

Referring to FIG. 2, a video decoding device (200) may include an entropy decoder (210), a residual processor (220), a predictor (230), an adder (240), a filter (250), and a memory (260). The residual processor (220) may include a re-arranger (221), a dequantizer (222), an inverse transformer (223).

When a bitstream including video information is input, the video decoding device (200) may reconstruct a video in relation to a process by which video information is processed in the video encoding device.

For example, the video decoding device (200) may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder (210) may parse the bitstream to output information required for video reconstruction or picture reconstruction. For example, the entropy decoder (210) may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information on prediction among information decoded in the entropy decoder (210) may be provided to the predictor (230) and residual values, that is, quantized transform coefficients, on which entropy decoding has been performed by the entropy decoder (210) may be input to the re-arranger (221).

The re-arranger (221) may rearrange the quantized transform coefficients into a two-dimensional block form. The re-arranger (221) may perform rearrangement corresponding to coefficient scanning performed by the encoding device. Although the re-arranger (221) is described as a separate component, the re-arranger (221) may be a part of the dequantizer (222).

The dequantizer (222) may de-quantize the quantized transform coefficients based on a (de)quantization parameter to output a transform coefficient. In this case, information for deriving a quantization parameter may be signaled from the encoding device.

The inverse transformer (223) may inverse-transform the transform coefficients to derive residual samples.

The predictor (230) may perform prediction on a current block, and may generate a predicted block including prediction samples for the current block. A unit of prediction performed in the predictor (230) may be a coding block or may be a transform block or may be a prediction block.

The predictor (230) may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor (230) may derive a prediction sample for a current block based on a neighboring reference sample in a current picture. The predictor (230) may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor (230) may derive a prediction sample for a current block based on a sample specified in a reference picture according to a motion vector. The predictor (230) may derive the prediction sample for the current block using one of the skip mode, the merge mode and the MVP mode. Here, motion information required for inter-prediction of the current block provided by the video encoding device, for example, a motion vector and information on a reference picture index may be obtained or derived based on the information on prediction.

In the skip mode and the merge mode, motion information of a neighboring block may be used as motion information of the current block. Here, the neighboring block may include a spatial neighboring block and a temporal neighboring block.

The predictor (230) may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor (230) may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor (230) may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor (230) may obtain a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder (240) can add a residual sample to a prediction sample to reconstruct a current block or a current picture. The adder (240) may reconstruct the current picture by adding the residual sample to the prediction sample in units of a block. When the skip mode is applied, a residual is not transmitted and thus the prediction sample may become a reconstructed sample. Although the adder (240) is described as a separate component, the adder (240) may be a part of the predictor (230). Meanwhile, the adder (240) may be referred to as a reconstructor or reconstructed block generator.

The filter (250) may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory (260) may store a reconstructed picture (decoded picture) or information necessary for decoding. Here, the reconstructed picture may be the reconstructed picture filtered by the filter (250). For example, the memory (260) may store pictures used for inter-prediction. Here, the pictures used for inter-prediction may be designated according to a reference picture set or a reference picture list. A reconstructed picture may be used as a reference picture for other pictures. The memory (260) may output reconstructed pictures in an output order.

As described above, the inter-prediction for a current block may be performed considering the motion of a target object or an image between pictures. In an example of the inter-prediction, the encoding device/decoding device may derive a prediction sample for a current block by applying a merge mode.

In the case of the merge mode, motion information of a neighboring block may be used as motion information of a current block, and the motion information may be derived based on a merge flag and a merge index. At this time, the neighboring block may include a spatial neighboring block and a temporal neighboring block. Specifically, in a case where the merge flag represents that the merge mode is applied to the current block, the encoding device/decoding device may construct a merge candidate list with motion information of an available neighboring block, and may use information, which the merge index indicates on the merge candidate list, as motion information of the current block.

However, limited motion information of the candidate block is used for constructing the merge candidate list, and thus, various characteristics of each image may not be reflected. That is, in the conventional merge candidate list, merge candidates are listed in the predetermined number thereof and in a predetermined order, and thus, it may occur that although the motion accuracy of a neighboring block at a particular position with respect to the current block is high, the motion information of the neighboring block is not selected as motion information of the current block in view of a bit amount generated due to the merge index. Therefore, there may be provided a method of reordering the merge candidate list in order to construct a merge candidate list effectively. In a case where the reordered merge candidate list, which is derived by applying the merge candidate list, is used, it is possible to improve motion accuracy with a small bit amount, thereby further increasing a compression efficiency. The present disclosure proposes a method capable of further increasing a compression efficiency by improving a merge candidate list refinement (MLR) method of reordering the merge candidate list.

Figure 3:
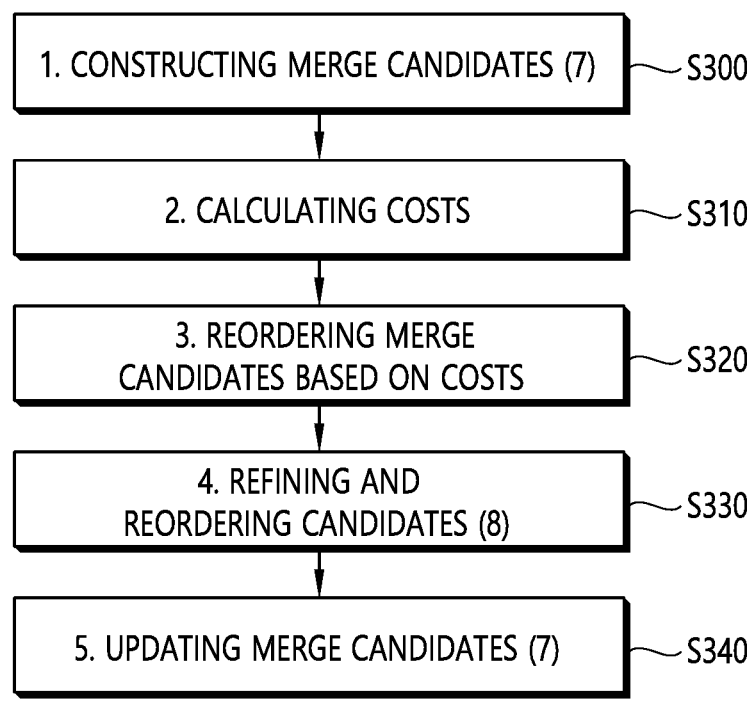
FIG. 3 represents an example of constructing the merge candidate list through the MLR.

FIG. 3 represents an example of constructing the merge candidate list through the MLR. Referring to FIG. 3, the encoding device/decoding device may construct merge candidates based on a neighboring block of a current block, calculate costs of the respective merge candidates, then reorder the merge candidates based on the costs of the merge candidates, and finally reconstruct a merge candidate list.

Specifically, the encoding device/decoding device may construct merge candidates of the maximum candidate number of a current block through the conventional merge candidate list construction method (S300). That is, the encoding device/decoding device may construct a merge candidate list including merge candidates of the maximum candidate number through the existing merge candidate list construction method. For example, the maximum candidate number may be seven.

The encoding device/decoding device may calculate the cost for the merge candidate of the merge candidate list (S310). In one example, the cost may be calculated based on a template. That is, the cost may be derived through a template matching method.

Figure 4:
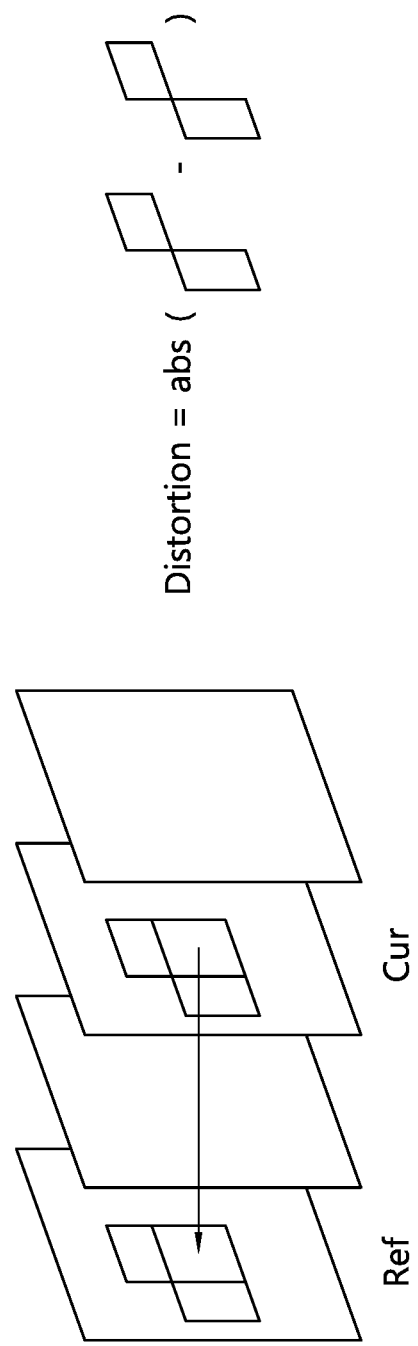
FIG. 4 represents an example of deriving a cost for a merge candidate of the current block through the template matching method.

FIG. 4 represents an example of deriving a cost for a merge candidate of the current block through the template matching method.

Referring to FIG. 4, the cost for the merge candidate may be derived based on sample values of the neighboring samples of the current block and sample values of neighboring samples of a candidate block which the merge candidate indicates. Referring to FIG. 4, the neighboring samples of the current block may include left neighboring samples and top neighboring samples, which may be referred to by the current block (casual). Further, referring to FIG. 4, any neighboring region of the current block may be set as a template of the current block, and the cost of the merge candidate may be derived using the template of the candidate block which the merge candidate on a reference picture indicates. Here, the template of the candidate block for the merge candidate may have the same size as that of the current block. In addition, as the decoding of the left neighboring samples and the top neighboring samples of the current block may be completed already at the time of the decoding of the current block, the left neighboring samples and the top neighboring samples of the current block may be used in a motion estimation process of the decoding device, so that they may be included in the template of the current block. That is, the template of the current block may be a predetermined region including the left neighboring samples and the top neighboring samples. Here, the cost may be derived as the sum of absolute differences between corresponding samples of the template of the current block and the template of the candidate block. For example, the cost may derived based on an equation as follows:
[Equation 1]

$$\text{Cost}_{distortion} = \sum_{(i,j) \in TemplateSize} |Temp_{ref}(i, j) - Temp_{cur}(i, j)|,$$

where i and j represent a position (i, j) of a sample within a template of a block; $\text{Cost}_{distortion}$, the cost; $Temp_{ref}$, a sample value of a template of the candidate block; and $Temp_{cur}$, a sample value of a template of the current block. The differences between the corresponding samples between the template of the reference block and the template of the current block may be accumulated, and the accumulation of differences may be used as the cost for the merge candidate.

The encoding device/decoding device may reorder the merge candidates of the merge candidate list based on the costs for the merge candidates (S320). For example, the encoding device/decoding device may reorder the merge candidates in an order from small to large costs of them. Alternatively, as another example, the encoding device/decoding device may reorder, so that the merge candidate having the smallest cost is first in an order.

The encoding device/decoding device may derive a refine merge candidate for the reordered merge candidate of the merge candidate list (S330). In a case where there are a plurality of the reordered merge candidates, the refine merge candidates may be derived in the reordered order. For example, the refine merge candidate may be derived by refining a motion vector of the reordered merge candidate. Specifically, the encoding device/decoding device may derive a template which has a small cost with the template of the current block, from among templates of the reference blocks included in any neighboring region of the candidate block which the reordered merge candidate indicates. The encoding device/decoding device may derive as a refine motion vector a motion vector indicating the reference block of the derived template. That is, the encoding device/decoding device may derive as the refine merge candidate a modified motion information indicating the reference block of the derived template. The encoding device/decoding device may cause the order of the refine merge candidate to come before the order of the reordered merge candidate. That is, the encoding device/decoding device may allocate a value that is less than a vale of an index for the reordered merge candidate to a value of an index for the refine merge candidate.

The encoding device/decoding device may derive the modified merge candidate list by selecting the predetermined number of candidates from among merge candidates and refine merge candidates (S340). For example, in a case where seven merge candidates are derived, and one refine merge candidate is derived, the encoding device/decoding device may select the seven candidates from among the eight candidates, and derive a modified merge candidate list based on the seven candidates. Further, the encoding device may signal information on the selected candidates.

Figure 5:
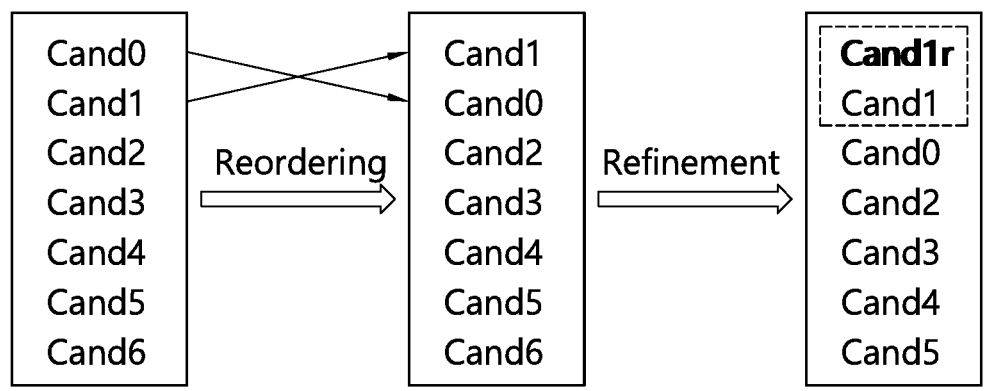
FIG. 5 represents an example of a modified merge candidate list derived through the MLR method.

FIG. 5 represents an example of a modified merge candidate list derived through the MLR method. Referring to FIG. 5, the modified merge candidate list may be derived through the reordering and the refinement of merge candidates of the current block. For example, the costs for the merge candidates of the current block may be derived through the template matching. Referring to FIG. 5, it may occur that the cost of a merge candidate Cand1 is less than that of a merge candidate Cand0, and in the merge candidate list, the order of the merge candidate Cand1 may be reordered to be first, and the order of the merge candidate Cand0 may be reordered to be second. As the merge candidate list is reordered based on the costs for the merge candidates, the merge index for the optimal merge candidate for the current block may be allocated with a small value. Further, referring to FIG. 5, motion information including a refine motion vector derived by performing refinement based on an optimal candidate, that is, a merge candidate reordered from small to large merge indexes, may be added as a merge candidate, through which a new candidate with a high accuracy may be used in the prediction of the current block. For example, referring to FIG. 5, the refinement may be performed on the merge candidate Cand1 which has been reordered to be first in order, so that a refine merge candidate Cand1r may be derived. The refine merge candidate Cand1r may be reordered to be first in order.

In addition, for example, the modified merge candidate list may be derived as described later.

Figure 6:
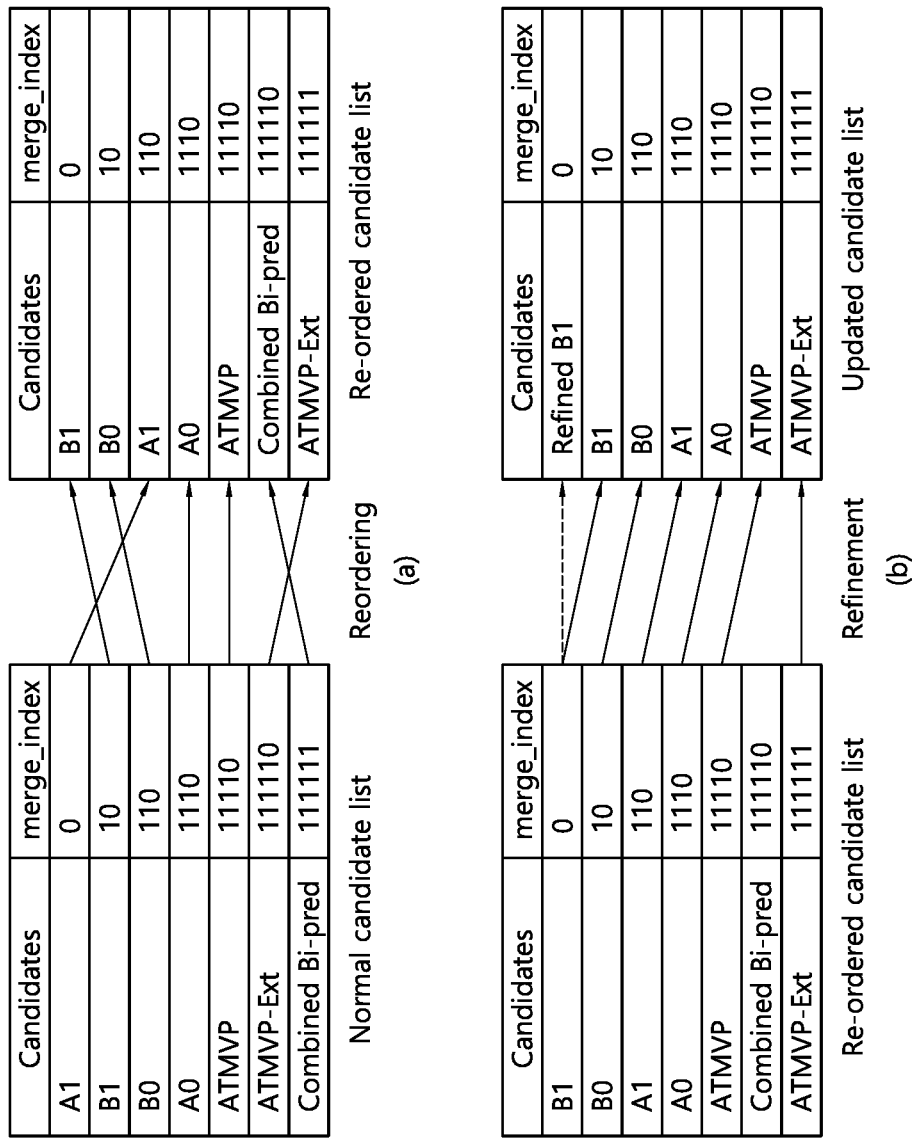
FIG. 6 represents an example of a modified merge candidate list derived through the MLR method.

FIG. 6 represents an example of a modified merge candidate list derived through the MLR method.

Referring to FIG. 6, the modified merge candidate list may be derived through the reordering and the refinement of merge candidates of the current block. For example, the costs for the merge candidates of the current block may be derived through the template matching, and the merge candidate list may be reordered based on the costs for the merge candidates, so that the merge index for the optimal merge candidate for the current block may be allocated with a small value. Referring to FIG. 6A, a cost of a merge candidate B1 may be the smallest among costs of merge candidates, and a cost of a merge candidate B0 may be less than that of a merge candidate A1. Further, a cost of a merge candidate Combined Bi-pred may be less than that of a merge candidate ATMVP-Ext. In this case, the merge candidate B1 may be reordered to be first in order in the merge candidate list; the merge candidate B0, to be second in order in the merge candidate list; and the merge candidate A1, to be third in order in the merge candidate list. The merge candidate Combined Bi-pred may be reordered to come in order before the merge candidate ATMVP-Ext. As the merge candidate list is reordered based on the costs for the merge candidates, the merge index for the optimal merge candidate for the current block may be allocated with a small value.

Further, motion information including a refine motion vector derived by performing refinement based on an optimal candidate, that is, a merge candidates reordered from small to large merge index values, may be added as a merge candidate, through which a new candidate with a high accuracy may be used in the prediction of the current block. For example, referring to FIG. 6B, the refinement may be performed on the merge candidate B1 which has been reordered to be first in order, so that a refine merge candidate Refined B1 may be derived. The refine merge candidate Refined B1 may be reordered to be first in order. Meanwhile, in a case where the refine merge candidate Refined B1 is added to the merge candidate list, the number of the merge candidates becomes greater than the maximum number, and thus any one of the merge candidates may be removed from the merge candidate list. For example, since the accuracy of the motion information generated through the combination becomes low, the merge candidate Combined Bi-pred may be removed from the merge candidate list of the current block. The merge candidates will be described in detail later.

Meanwhile, the method of constructing the merge candidate of the current block may be as described later.

For example, the kind and the check order of the motion information, which may be constructed as a merge candidate for the current block, may be derived as in the following table.

TABLE 1

A1
B1
B0
A0
ATMVP
STMVP
B2
TMVP
Combined
Zero

Here, A1 represents motion information of a left neighboring block of the current block; B1, motion information of a top neighboring block of the current block; B0, motion information of a top-right neighboring block of the current block; A0, motion information of a bottom-left neighboring block of the current block; ATMVP, motion information of a co-located block which is indicated by motion information of a predetermined neighboring block of the current block; STMVP, motion information derived based on motion information of a spatial neighboring block and motion information of a temporal neighboring block of the current block; B2, motion information of a top-left neighboring block of the current block; TMVP, motion information of a temporal neighboring block of the current block; Combined, motion information derived by combining motion information of a neighboring block of the current block; and Zero, a motion vector with a zero value.

The neighboring block of the current block may include a spatial neighboring block existing in the current picture, and a temporal neighboring block existing in the reference picture. The spatial neighboring block may include the left neighboring block, the top neighboring block, the top-left neighboring block, the bottom-left neighboring block, and the top-right neighboring block of the current block, and the temporal neighboring block may represent the co-located block including a position in the reference picture corresponding to the bottom-right position or central position of the current block.

For example, if a size of the current block is W×H, and an x component of the top-left sample position of the current block is 0 and a y component thereof is 0, the left neighboring block may be a block including a top-left sample at coordinates (−1, H−1); the top neighboring block, a block including a top-left sample at coordinates (W−1, −1); the top-right neighboring block, a block including a top-left sample at coordinates (W, −1); the bottom-left neighboring block, a block including a top-left sample at coordinates (−1, H); and the top-left neighboring block, a block including a top-left sample at coordinates (−1, −1).

Referring to Table 1, motion information of a spatial/temporal neighboring block, and motion information which has been generated by combining motion information (motion vector and reference picture index) of a neighboring block, or the like may be derived as motion information for the merge candidate of the current block. The encoding device/decoding device may determine whether the motion informations disclosed in Table 1 above are used in an order from top to bottom as the merge candidate of the current block, and may construct a merge list including merge candidates of the predetermined maximum number (e.g., seven) based on the motion informations. The merge index, which indicates one candidate among merge candidates included in the constructed merge candidate list, may be signaled, and thus a redundancy check process is necessary so that various merge candidates, which are not redundant with each other, can be added to the merge candidate list without signaling overhead. Therefore, a candidate having the same motion vector (MV) and the reference picture (ref_idx) as those of another candidate may be removed through the redundancy check process.

Specifically, the encoding device/decoding device may determine whether the motion informations disclosed in Table 1 above are used in an order from top to bottom as the merge candidate of the current block. That is, the encoding device/decoding device may determine whether A1, B1, B0, A0, ATMVP, STMVP, B2, TMVP, Combined, and Zero are used in this order as the merge candidate of the current block. The determining process may represent the above-described redundancy check process. For example, in a case where a certain motion information is the same as the motion information which has been already derived as the merge candidate, the certain motion information may be determined not to be used as the merge candidate of the current block, and the certain motion information may not be derived as the merge candidate of the current block. For example, in a case where A1 is derived as the merge candidate and added to the merge candidate list, and the redundancy check process is performed on B1, the encoding device/decoding device may check whether B1 is redundant with the merge candidate added to the merge candidate list (for example, A1), and may add B1 to the merge candidate list only when they are different from each other. Further, after this, in a case where the redundancy check process is performed on B0, the encoding device/decoding device may check whether B0 is redundant with the merge candidates added earlier to the merge candidate list (for example, A1 and B1), and may add B0 to the merge candidate list only when they are different from each other.

The motion information, which has been determined to be used as the merge candidate of the current block, may be derived as the merge candidate of the current block, and the derived merge candidates may be included in the merge candidate list in such an order that they are derived. Further, in a case where the merge candidates of the predetermined number have been derived, it may not be performed to determine whether to use as the merge candidate the motion information coming after the motion information which has been derived as the merge candidate. That is, in a case where the merge candidates of the predetermined number have been derived, the motion information, which comes after the motion information that has been derived as the merge candidate, may not be derived as the merge candidate of the current block.

Meanwhile, as described above, in the ATMVP or the STMVP, the motion information may be derived in a sub-block unit. In the candidate whose motion information is derived in a sub-block unit like the ATMVP or the STMVP, only when all the motion informations of a sub-block unit are the same, the redundancy check process may be performed between the candidate and the merge candidates which have been earlier added to the merge candidate list, and in a case where the candidate is different from the merge candidate added to the merge candidate list, it may be added to the merge candidate list. In the candidate whose motion information of a sub-block unit is derived, the redundancy check process for the candidate may not be performed in a case where all the motion informations of a sub-block unit are not the same, that is, at least one of the motion informations of a sub-block unit of the candidate is different.

Further, the redundancy check process between the candidates whose motion information of a sub-block unit is derived like the ATMVP and the STMVP may be performed in a sub-block unit. That is, in a case where the candidate including the motion information of a sub-block unit is the same as the merge candidates including the motion information of a sub-block unit included in the merge candidate list in terms of the motion informations of a sub-block unit, the candidate may not be derived as the merge candidate of the current block, and may not be included in the merge candidate list.

Further, in a case where the motion information generated by combining motion informations of the neighboring blocks as in the Combined is the same as other motion information added as the merge candidate to the merge candidate list, the motion information generated by combining motion informations of the neighboring blocks may be excluded from the merge candidate list through the redundancy check process. Further, in a case where a target to be combined is motion information including the motion information of a sub-block unit like the ATMVP or the STMVP, the combination may be made based on the representative motion information among the motion informations of a sub-block unit. In this case, the accuracy of the motion information generated through the combination becomes low, and thus the Combined may be excluded from the motion information for the merge candidate of the current block. Meanwhile, the Combined may be represented as Combined bi-pred.

As described above, in a case where any neighboring region of the current block, that is, the template of the current block, is available, the merge candidate list may be reordered and/or refined based on the any neighboring region. Meanwhile, in a case where the template is not available, the reordering may not performed on the merge candidate list of the current block, and a merge index for the merge candidates which are not reordered may be signaled.

The cost of the merge candidate may be derived using the template of the current block and the template of the reference block which the merge candidate on the reference picture indicates, and the cost may be derived as the sum of absolute differences (SAD) between corresponding samples of the template of the current block and the template of the candidate block. The accuracy of the motion information may be predicted based on the adjacent region similarity between the current block and the reference block.

Figure 7:
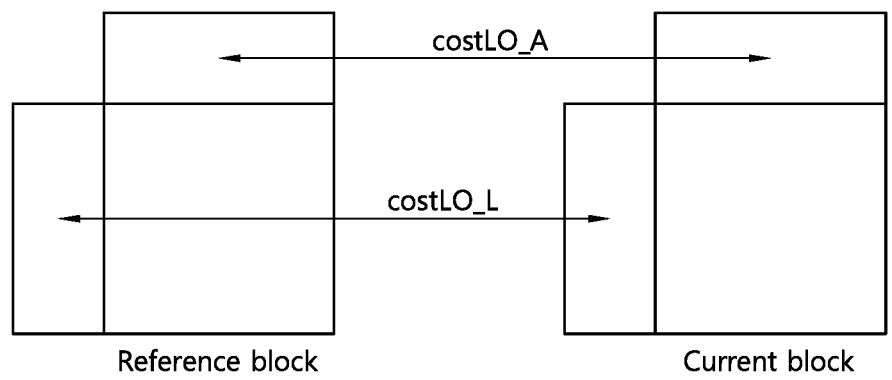
FIG. 7 represents an example of deriving a cost of a merge candidate based on a template.

FIG. 7 represents an example of deriving a cost of a merge candidate based on a template.

The template of the current block may include a left neighboring region and/or a top neighboring region of the current block, the template of the reference block may be a region corresponding to the template of the current block, and the template of the reference block may include a left neighboring region and/or a top neighboring region of the reference block. In a case where the left neighboring region and/or the top neighboring region are/is available, the cost of the merge candidate may be calculated as the SAD with respect to the respective neighboring regions. That is, for example, the cost may be calculated as the SAD between the left neighboring region of the current block and the left neighboring region of the reference block which the merge candidate indicates, and as the SAD between the top neighboring region of the current block and the top neighboring region of the reference block which the merge candidate indicates.

Meanwhile, the motion information for the inter-prediction may be bi-prediction motion information or uni-prediction motion information. Here, the bi-prediction motion information may include an L0 reference picture index and an L0 motion vector (L0 motion information), and an L1 reference picture index and an L1 motion vector (L1 motion information), and the uni-prediction motion information may include the L0 reference picture index and the L0 motion vector (L0 motion information), or may include the L1 reference picture index and the L1 motion vector (L1 motion information). The L0 represents a reference picture list L0 (List 0), and the L1 represents a reference picture list L1 (List 1).

In a case where the merge candidate includes the L0 motion information, the costL0 of the merge candidate may be derived as the SAD between the template of the current block and the template of the reference block which the L0 motion information of the merge candidate indicates.

Further, in a case where the merge candidate includes the L1 motion information, the costL0 of the merge candidate may be derived as the SAD between the template of the current block and the template of the reference block which the L0 motion information of the merge candidate indicates.

Additionally, in a case where the merge candidate includes the L0 motion information and the L1 motion information, that is, the merge candidate is the bi-prediction motion information, the cost of the merge candidate may be calculated as an average of the costL0 and the costL1.

Therefore, in a case where the merge candidate is the bi-prediction motion information, the costL0 of the merge candidate may be derived as the SAD between the template of the current block and the template of the reference block which the L0 motion information of the merge candidate indicates, and the costL1 of the merge candidate may be derived as the SAD between the template of the current block and the template of the reference block which the L1 motion information of the merge candidate indicates. The cost of the merge candidate may be calculated as the average of the costL0 and the costL1.

Referring to FIG. 7, in a case where the template of the current block includes the top neighboring region and the left neighboring region, and the merge candidate includes the L0 motion information, the costL0 of the merge candidate may be derived as the sum of costL0_A between the top neighboring region of the current block and the top neighboring region of the reference block which the L0 motion information of the merge candidate indicates, and the costL0_L between the left neighboring region of the current block and the left neighboring region of the reference block which the L0 motion information of the merge candidate indicates. The costL0_A may be the SAD between the top neighboring region of the current block and the top neighboring region of the reference block, and the costL0_L may be the SAD between the left neighboring region of the current block and the left neighboring region of the reference block.

The costL0 of the merge candidate may be derived based on an equation as follows:

$$\text{cost}L0 = \text{cost}L0\_A + \text{cost}L0\_L, \quad [\text{Equation 2}]$$

where costL0 represents the costL0 of the merge candidate, costL0_A represents the merge candidate costL0_A, and costL0_L represents the merge candidate costL0_L.

Further, in a case where the template of the current block includes the top neighboring region and the left neighboring region, and the merge candidate includes the L1 motion information, the costL1 of the merge candidate may be derived as the sum of costL1_A between the top neighboring region of the current block and the top neighboring region of the reference block which the L1 motion information of the merge candidate indicates, and the costL1_L between the left neighboring region of the current block and the left neighboring region of the reference block which the L1 motion information of the merge candidate indicates. The costL1_A may be the SAD between the top neighboring region of the current block and the top neighboring region of the reference block, and the costL1_L may be the SAD between the left neighboring region of the current block and the left neighboring region of the reference block.

The costL1 of the merge candidate may be derived based on an equation as follows:

$$\text{cost}L1 = \text{cost}L1\_A + \text{cost}L1\_L, \quad [\text{Equation 3}]$$

where costL1 represents the costL1 of the merge candidate, costL1_A represents the merge candidate costL1_A, and costL1_L represents the merge candidate costL1_L.

Meanwhile, in a case where the merge candidate includes the L0 motion information and the L1 motion information, that is, the merge candidate is the bi-prediction motion information, the cost of the merge candidate may be calculated as the average of the costL0 and the costL1.

The cost of the merge candidate, which is the bi-prediction motion information, may be derived based on an equation as follows:

$$\text{cost}Bi = (\text{cost}L0 + \text{cost\_uni}L1) >> 1, \quad [\text{Equation 4}]$$

where costBi represents the cost of the merge candidate, costL0 represents the costL1 of the merge candidate, and costL1 represents the costL1 of the merge candidate.

Meanwhile, whether the template is available may be determined based on conditions as follows:
whether there is a real sample or not
whether a slice boundary or a tile boundary
whether the intra mode is applied or not That is, the determination on whether the template is available may be made based on whether there is a sample included in the template. Further, the determination on whether the template is available may be made based on whether the template is a region adjacent to the slice boundary or the tile boundary. Further, the determination on whether the template is available may be made based on whether the template is a region which is decoded based on the intra mode.

In a case where the cost for the merge candidate is derived based on the template as described above, the cost of the merge candidate may be changed according to the position of the neighboring block due to the characteristic of the merge mode that the motion information of the neighboring block, which is the merge candidate, is used as the motion information of the current block. In this regard, the present disclosure proposes a method as follows, which prevents the cost from being changed greatly according to the position, and improves the method of deriving the cost.

FIG. 8 illustratively represents costs according to a position and a size of a template. Referring to FIG. 8A, in relation to the motion information of the left neighboring block, a small cost may be derived for the left template, and a large cost may be derived for the top template. Here, the left template may represent the left neighboring region, and the top template may represent the top neighboring region. The cost for the left template of the motion information of the left neighboring block may be derived as the SAD between the left template of the reference block which the motion information of the left neighboring block indicates, and the left template of the current block, and the cost for the top template of the motion information of the left neighboring block may be derived as the SAD between the top template of the reference block which the motion information of the left neighboring block indicates, and the top template of the current block. Therefore, since the left template is the left neighboring region of the current block, it may represent a reconstructed block of the left neighboring block, and since the reference block is a reference block which is derived based on the motion information of the left neighboring block, the cost for the left template of the motion information of the left neighboring block may mean distortion between the reconstructed block and the reference block, and a small cost for the left template may be derived with respect to the motion information of the left neighboring block.

Further, referring to FIG. 8A, in relation to the motion information of the top neighboring block, a small cost may be derived for the top template, and a large cost may be derived for the left template. The cost for the left template of the motion information of the top neighboring block may be derived as the SAD between the left template of the reference block which the motion information of the top neighboring block indicates, and the left template of the current block, and the cost for the top template of the motion information of the top neighboring block may be derived as the SAD between the top template of the reference block which the motion information of the top neighboring block indicates, and the top template of the current block. Therefore, since the top template is the top neighboring region of the current block, it may represent a reconstructed block of the top neighboring block, and since the reference block is a reference block which is derived based on the motion information of the top neighboring block, the cost for the top template of the motion information of the top neighboring block may mean distortion between the reconstructed block and the reference block, and a small cost for the top template may be derived with respect to the motion information of the top neighboring block.

The above-described phenomenon that the cost is changed according to the position and the size of the template may become more serious when the current block is a nonsquare block.

Referring to FIG. 8B, in a case where the current block is a nonsquare block having a height greater than a width, in relation to the motion information of the left neighboring block, a small cost may be derived for the left template and a large cost may be derived for the top template. However, in a case where the current block is the nonsquare block having the height greater than the width, since the size of the top template is small, the influence to the cost of the motion information of the left neighboring block may be small even though the cost for the top template is large.

Referring to FIG. 8B, in a case where the current block is the nonsquare block having the height greater than the width, in relation to the motion information of the top neighboring block, a small cost may be derived for the top template, and a large cost may be derived for the left template. However, in a case where the current block is the nonsquare block having the height greater than the width, since the size of the left template is large, the influence to the cost of the motion information of the top neighboring block of the cost for the left template may become greater. Therefore, a case where the motion information of the left neighboring block is used may be relatively advantageous in terms of the cost.

Referring to FIG. 8C, in a case where the current block is a nonsquare block having the width greater than the height, in relation to the motion information of the left neighboring block, a small cost may be derived for the left template and a large cost may be derived for the top template. However, in a case where the current block is the nonsquare block having the width greater than the height, since the size of the top template is large, the influence to the cost of the motion information of the left neighboring block of the cost for the top template may become greater.

Referring to FIG. 8C, in a case where the current block is the nonsquare block having the width greater than the height, in relation to the motion information of the top neighboring block, a small cost may be derived for the top template and a large cost may be derived for the left template. However, in a case where the current block is the nonsquare block having the width greater than the height, since the size of the left template is small, the influence to the cost of the motion information of the top neighboring block may be small even though the cost for the left template is large. Therefore, a case where the motion information of the top neighboring block is used may be relatively advantageous in terms of the cost.

In order to improve this described above, there may be proposed a method of decreasing the influence caused by the template size by normalizing the cost of respective the left template and the top template.

For example, in a case where the size of the current block is width×height, and the template size is 2, the size of the left template may be (2×height), and the size of the top template may be (width×2). In this case, the cost of the left template and the cost of the top template which have been normalized may be derived based on an equation as follows:

$$costL' = costL \gg \log 2(2 \times height)$$

$$costA' = costA \gg \log 2(width \times 2), \quad \text{[Equation 5]}$$

where costL' represents the cost of the left template which has been normalized, costA' represents the cost of the top template which has been normalized, costL represents the cost of the left template, costA represents the cost of the top template, width represents the width of the current block, and height represents the height of the current block. The cost may be a cost of a sample unit.

Meanwhile, the size of the template may be derived based on the size of the current block. For example, in a case where the size of the current block is less than 16×16, the size of the template may be derived as 2, and in a case where the size of the current block is equal to or greater than 16×16, the size of the template may be derived as 4. Further, the size of the template may be derived as 2 irrespective of the size of the current block. The template for the merge candidate may include a top-left sample at (−n, 0), may include the left neighboring region (left template) having a size of n×H, and a top-left sample at (0, −n), and may include the top neighboring region (top template) having a size of W×n. Here, n represents the size of the template.

The above-described reordering process may be performed on the merge candidate list based on the normalized costs of the merge candidates.

Meanwhile, it may occur that the cost values are truncated by dividing the costs with the size of the current block in order to derive the normalized cost, through which even different cost values become the same. Therefore, the encoding device/decoding device may up-scale the cost of the merge candidate, and may derive the normalized cost based on the up-scaled cost. For example, the cost of the left template and the cost of the top template which have been normalized may be derived based on an equation as follows:

$$costL'=(costL*scale)>>\log 2(2\times height)$$

$$costA'=(costA*scale)>>\log 2(width\times 2), \quad \text{[Equation 6]}$$

where costL' represents the cost of the left template which has been normalized, costA' represents the cost of the top template which has been normalized, costL represents the cost of the left template, costA represents the cost of the top template, width represents the width of the current block, and height represents the height of the current block. Further, scale represents a value for the up-scaling. The scale may be derived as an equation as follows:

$$scale=(width+height)*2, \quad \text{[Equation 7]}$$

where scale represents a value for the up-scaling, width represents the width of the current block, and height represents the height of the current block.

The normalized costs derived based on Equation 6 or 7 above may be used also in the above-described refine process of the reordered merge candidate. However, unlike the above-described reordering process, the cost does not need to be down-scaled because the corresponding reordered merge candidate is refined. Therefore, in a case where the reordered merge candidate is refined, the optimal motion vector, the refine motion vector, may be derived based on the value of the cost derived as the SAD. That is, the cost used in the reordering process (for example, normalized cost) may be different from the cost used in the refine process. Alternatively, for the convenience of calculation, the same cost may be used.

Meanwhile, as above-described, the template may include the left neighboring region and the top neighboring region of the block. However, among the spatial neighboring blocks A1, B1, B0, A0, and B2, the A1 and the B1 may be located within the template, and thus relatively small costs may be derived for the merge candidates (merge candidate A1, merge candidate B1) which have been derived based on the motion information of the A1 and the motion information of the B1, and the probability that they are selected for deriving a merge candidate or refine merge candidate which is reordered as a merge index of a small value may become high. Therefore, a region which is variable according to the position of the spatial merge candidate that has been derived based on the spatial neighboring blocks may be used as the template. That is, different regions for respective merge candidates may be used as the template for deriving the cost.

FIG. 9 illustratively represents a template for a merge candidate. Referring to FIG. 9A, the spatial neighboring blocks B0, A0 and B2 are not included in the left neighboring region and the top neighboring region, but the spatial neighboring blocks A1 and B1 may be included in the left neighboring region and the top neighboring region. Therefore, for example, as shown in FIG. 9B, the template for the merge candidate A1 may include the top-left neighboring region, the top neighboring region, and the left neighboring region except the region of the spatial neighboring block A1. Further, as shown in FIG. 9B, the template for the merge candidate B1 may include the top-left neighboring region, the left neighboring region and the top neighboring region except the region of the spatial neighboring block B1. Further, the templates for the merge candidates B0, A0 and B2 may include the top neighboring region and the left neighboring region as described above. For example, in a case where the size of the current block is W×H, and an x component of a top-left sample position of the current block is 0 and a y component thereof is 0, the template for the merge candidate A1 may include a top-left sample at (−n, −n), may include the left neighboring region (left template) having a size of n×(n+H−1), and a top-left sample at (0, −n), and may include the top neighboring region (top template) having a size of W×n. Here, n may represent the above-described template size. Further, in a case where the size of the current block is W×H, and an x component of a top-left sample position of the current block is 0 and a y component thereof is 0, the template for the merge candidate B1 may include a top-left sample at (−n, 0), may include the left neighboring region (left template) having a size of n×H, and a top-left sample at (−n, −n), and may include the top neighboring region (top template) having a size of (n+W−1)×n. Further, in a case where the size of the current block is W×H, and an x component of a top-left sample position of the current block is 0 and a y component thereof is 0, the template for the merge candidates A0, B0 and B2 may include a top-left sample at (−n, 0), may include the left neighboring region (left template) having a size of n×H, and a top-left sample at (0, −n), and may include the top neighboring region (top template) having a size of W×n.

Meanwhile, as described above, after the refine merge candidate is derived, the encoding device/decoding device may reorder the refine merge candidate and the existing merge candidates.

Figure 10:
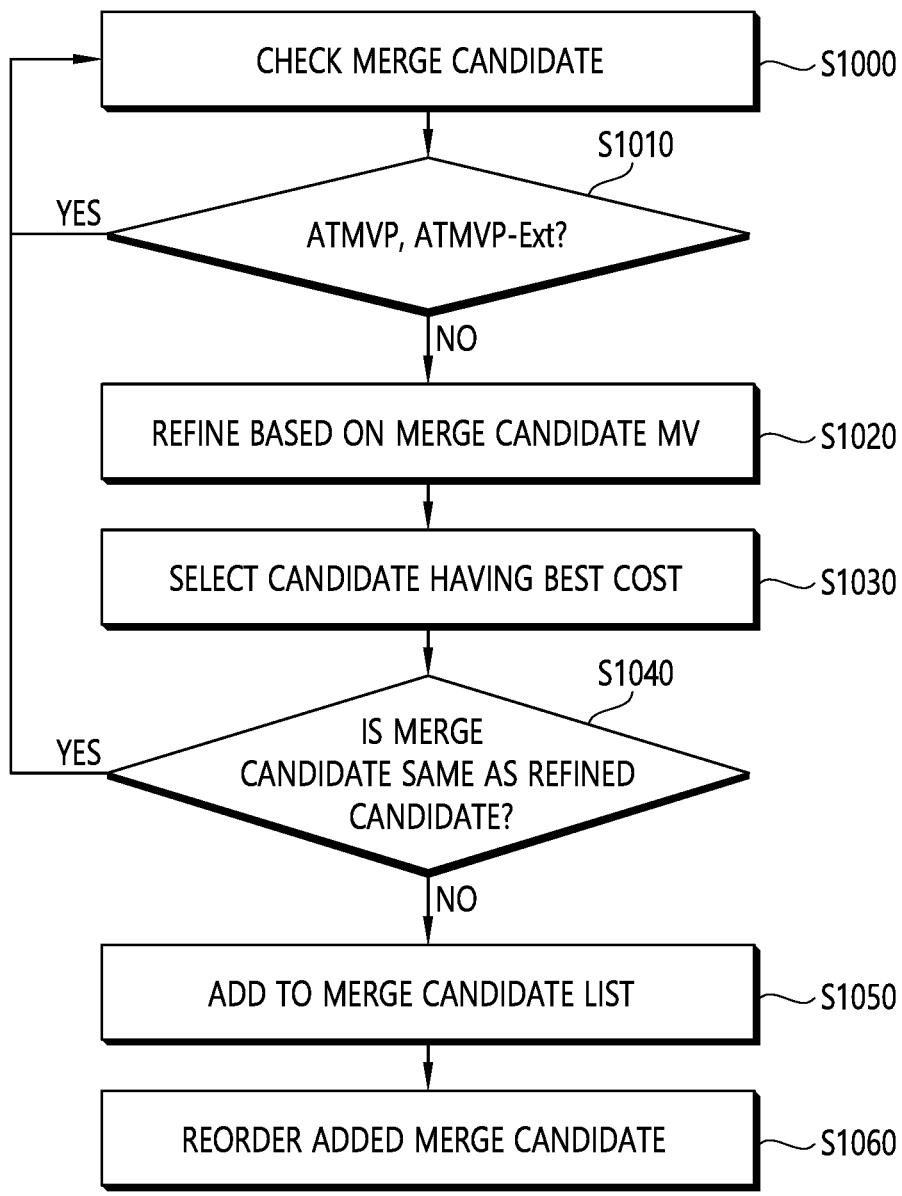
FIG. 10 represents an example of the refine process and the reordering process for the merge candidate.

FIG. 10 represents an example of the refine process and the reordering process for the merge candidate. The encoding device/decoding device may derive the reordered merge candidate list, and check the merge candidate of the reordered merge candidate list (S1000). The merge candidates may be reordered based on the cost. For example, the merge candidates may be reordered from small to large costs thereof, and the encoding device/decoding device may perform the refinement process from the merge candidate having the smallest cost.

The encoding device/decoding device may determine whether the merge candidate is the ATMVP or an ATMVP-Ext (S1010). The encoding device/decoding device may determine whether the merge candidate is a merge candidate including motion information of a sub-block unit like the ATMVP and the ATMVP-Ext. In a case where the merge candidate is a merge candidate including the motion information of a sub-block unit, the encoding device/decoding device may exclude it from targets of the refinement process.

In a case where the merge candidate is neither the ATMVP nor the ATMVP-Ext, the encoding device/decoding device may perform the refinement process based on the motion vector of the merge candidate (S1020). The encoding device/decoding device may derive the refine merge candidate by refining the motion vector of the merge candidate. For example, the encoding device/decoding device may derive a template which has the smallest cost with the template of the current block, from among templates of the reference blocks included in any neighboring region of the candidate block which the merge candidate indicates. The encoding device/decoding device may derive a motion vector indicating the reference block of the derived template as the refine motion vector (S1030). That is, the encoding device/decoding device may derive as the refine merge candidate a modified motion information indicating the reference block of the derived template.

The encoding device/decoding device determine whether the refine merge candidate is the same as the merge candidate (S1040). In a case where the refine merge candidate is the same as the merge candidate, the refine merge candidate may not be added to the merge candidate list, and the refine process may be performed on a merge candidate which comes in order immediately after the merge candidate on the merge candidate list.

In a case where the refine merge candidate is not the same as the merge candidate, the encoding device/decoding device may add the refine merge candidate to the merge candidate list (S1050). The encoding device/decoding device may reorder the merge candidate list including the refine merge candidate (S1060).

Figure 11:
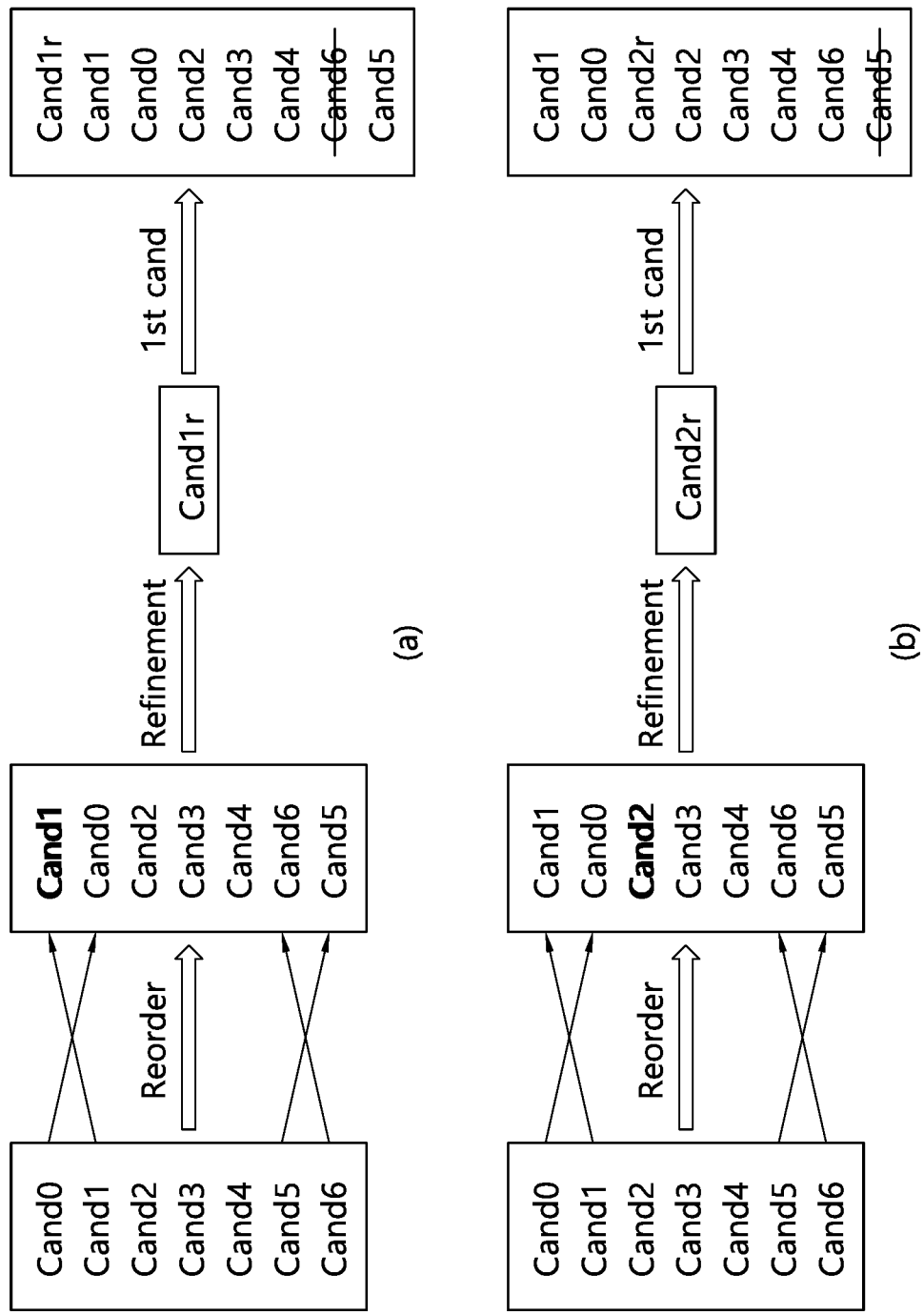
FIG. 11 illustratively represents the modified merge candidate list which has been derived through the refine process and the reordering process for the merge candidate.

FIG. 11 illustratively represents the modified merge candidate list which has been derived through the refine process and the reordering process for the merge candidate.

Referring to FIG. 11A, based on the cost, a merge candidate Cand1 may be reordered to be first in order in the merge candidate list; a merge candidate Cand0, to be second in order in the merge candidate list; a merge candidate Cand5, to be seventh in order in the merge candidate list; and a merge candidate Cand6, to be fifth in order in the merge candidate list. After this, the refinement may be performed on the merge candidate Cand1, so the refine merge candidate Cand1r may be derived, and since the refine merge candidate Cand1r has the smallest cost value, the refine merge candidate Cand1r may be reordered to be first in order in the merge candidate list.

Referring to FIG. 11B, based on the cost, a merge candidate Cand1 may be reordered to be first in order in the merge candidate list; a merge candidate Cand0, to be second in order in the merge candidate list; a merge candidate Cand5, to be seventh in order in the merge candidate list; and a merge candidate Cand6, to be fifth in order in the merge candidate list. After this, the encoding device/decoding device may perform the refine process on the merge candidates in the reordered order. As described above, in a case where the refine merge candidate is the same as the merge candidate which is the standard of the refine merge candidate, the refine merge candidate may not be added. Referring to FIG. 11B, the refinement may be performed on the merge candidate Cand2 through the above-described refinement process, so that the refine merge candidate Cand2r may be derived. In this case, the refine merge candidate Cand2r may be reordered based on the cost value of the refine merge candidate Cand2r. Referring to FIG. 11B, the refine merge candidate Cand2r may be reordered to be third in order in the merge candidate list.

Meanwhile, in a case where the maximum number of the merge candidates in the merge candidate list is seven, the number of merge candidates may be eight due to the derived refine merge candidate. Therefore, any one merge candidate may be removed from among the eight merge candidates in total. For example, there may be the following examples of a method of removing one merge candidate from among the merge candidates.

The last merge candidate in the existing merge candidate list

A candidate having the largest template-based cost (the last merge candidate in order in the modified merge candidate list)

A merge candidate for the refine merge candidate

For example, the merge candidate last in order in the existing merge candidate list may be removed from among the merge candidates. Referring to FIG. 11A, the last merge candidate in order in the merge candidate list which has been derived based on the motion information of the neighboring blocks of the current block is a merge candidate Cand6, and the merge candidate Cand6 may be removed from the modified merge candidate list.

Further, as another example, the merge candidate having the largest cost may be removed from among the merge candidates. Referring to FIG. 11B, among the merge candidates, the merge candidate having the largest cost is a merge candidate Cand5, and the merge candidate Cand5 may be removed from the modified merge candidate list.

Further, as another example, the merge candidate for the refine merge candidate may be removed from among the merge candidates. That is, the merge candidate which has been the standard of the refine merge candidate may be removed. For example, in a case where the refine merge candidate Cand1r has been derived based on the merge candidate Cand1, the merge candidate Cand1 may be removed from the modified merge candidate list. Alternatively, for example, in a case where the refine merge candidate Cand2r has been derived based on the merge candidate Cand2, the merge candidate Cand2 may be removed from the modified merge candidate list. Meanwhile, the above-described method of removing a merge candidate may be applied variably according to the construction order of the merge candidate or the order of the refine merge candidate, or may be maintained the same irrespective of the construction order of the merge candidate or the order of the refine merge candidate.

Meanwhile, in a case where the refine merge candidate has been derived, the modified merge candidate list may be constructed as described later.

Figure 12:
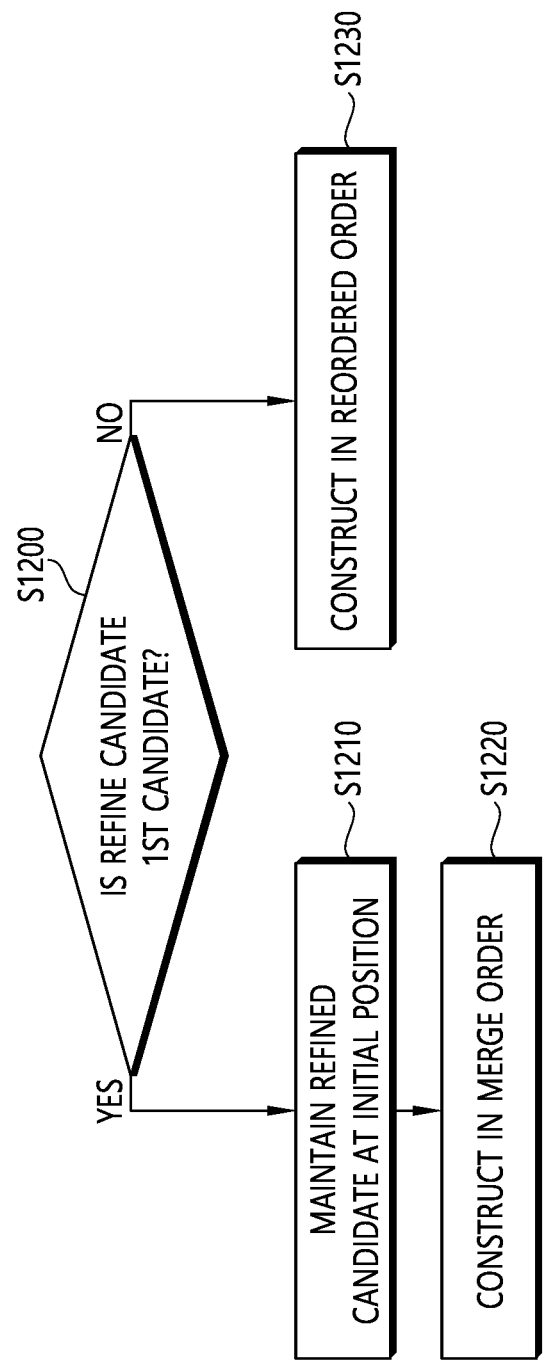
FIG. 12 represents an example of constructing a modified merge candidate list including a refine merge candidate.

FIG. 12 represents an example of constructing a modified merge candidate list including a refine merge candidate. Since the selectivity of the refine merge candidate may be changed according to the position of the refine merge candidate, other modified merge candidate list construction method may be considered according to the order of the refine merge candidate.

The encoding device/decoding device may determine whether the refine merge candidate is a first merge candidate in order (S1200). In a case where the refine merge candidate is a first merge candidate in order, the encoding device/decoding device may performing the reordering so that the refine merge candidate may be first in order (S1210), and that the other merge candidates may be in order of the existing merge candidate list, while constructing the modified merge candidate list (S1220). In a case where the refine merge candidate is not a first merge candidate in order, the encoding device/decoding device may maintain the modified merge candidate list (S1230).

Figure 13:
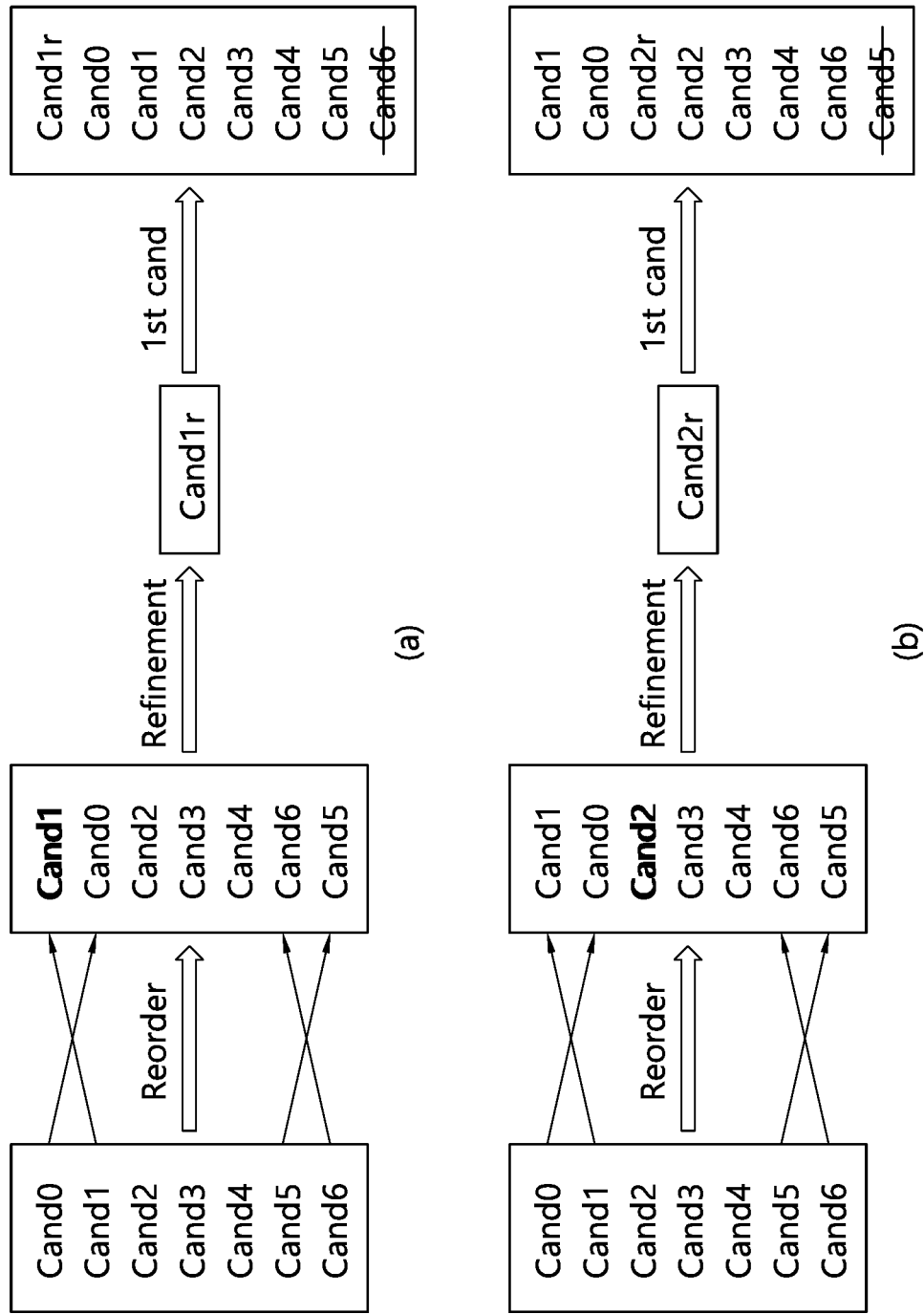
FIG. 13 illustratively represents a modified merge candidate list including a refine merge candidate.

FIG. 13 illustratively represents a modified merge candidate list including a refine merge candidate. Referring to FIG. 13A, based on the cost, a merge candidate Cand1 may be reordered to be first in order in the merge candidate list; a merge candidate Cand0, to be second in order in the merge candidate list; a merge candidate Cand5, to be seventh in order in the merge candidate list; and a merge candidate Cand6, to be fifth in order in the merge candidate list. After this, the refinement may be performed on the merge candidate Cand1, so the refine merge candidate Cand1r may be derived, and since the refine merge candidate Cand1r has the smallest cost value, the refine merge candidate Cand1r may be reordered to be first in order in the merge candidate list. In this case, since the refine merge candidate Cand1r is first in order in the merge candidate list, the encoding device/ decoding device may perform the reordering so that the other merge candidates than the refine merge candidate Cand1r may be in order of the existing merge candidate list, while constructing the modified merge candidate list. Therefore, the modified merge candidate list may be constructed with the refine merge candidate Cand1r, the merge candidate Cand0, the merge candidate Cand1, the merge candidate Cand2, the merge candidate Cand3, the merge candidate Cand4, the merge candidate Cand5, and the merge candidate Cand6 in this order, and the last merge candidate Cand6 in order may be removed from the modified merge candidate list.

Referring to FIG. 13B, based on the cost, a merge candidate Cand1 may be reordered to be first in order in the merge candidate list; a merge candidate Cand0, to be second in order in the merge candidate list; a merge candidate Cand5, to be seventh in order in the merge candidate list; and a merge candidate Cand6, to be fifth in order in the merge candidate list. After this, the encoding device/decoding device may perform the refine process on the merge candidates in the reordered order. As described above, in a case where the refine merge candidate is the same as the merge candidate which is the standard of the refine merge candidate, the refine merge candidate may not be added. Referring to FIG. 13B, the refinement may be performed on the merge candidate Cand2 through the above-described refine process, so that the refine merge candidate Cand2r may be derived. In this case, the refine merge candidate Cand2r may be reordered based on the cost value of the refine merge candidate Cand2r. Referring to FIG. 13B, the refine merge candidate Cand2r may be reordered to be third in order in the merge candidate list. In this case, since the refine merge candidate Cand2r is not first in order in the merge candidate list, the other merge candidates than the refine merge candidate Cand2r may be constructed in the reordered order. Therefore, the modified merge candidate list may be constructed with the merge candidate Cand1, the merge candidate Cand0, the merge candidate Cand2r, the merge candidate Cand2, the merge candidate Cand3, the merge candidate Cand4, the merge candidate Cand6, and the merge candidate Cand5 in this order, and the last merge candidate Cand5 in order in the modified merge candidate list may be removed from the modified merge candidate list.

Although in the above-described embodiment the method of constructing the modified candidate list differently according to the order of the refine merge candidate is described, there may be proposed various construction methods, such as a method in which, unlike the above-described embodiment, by comparing the template-based cost with the predetermined critical value, the merge candidate for the cost less than the predetermined critical value maintains the reordered order, while the merge candidate for the cost greater than the predetermined critical value maintains the order in the existing merge candidate list. Further, as shown in FIG. 13B, in a case where the cost of the refine merge candidate is not lowest, that is, the refine merge candidate is not reordered to be first in order, the selectivity of the refine merge candidate may be low, and thus, there may also be proposed a method in which the modified merge candidate list is constructed only with the existing merge candidates while excluding the refine merge candidate from the modified merge candidate list.

Meanwhile, in a case where there is a redundant motion information in the modified merge candidate list, there may be proposed a method in which it is removed to allow a small bit to be allocated.

Figure 14:
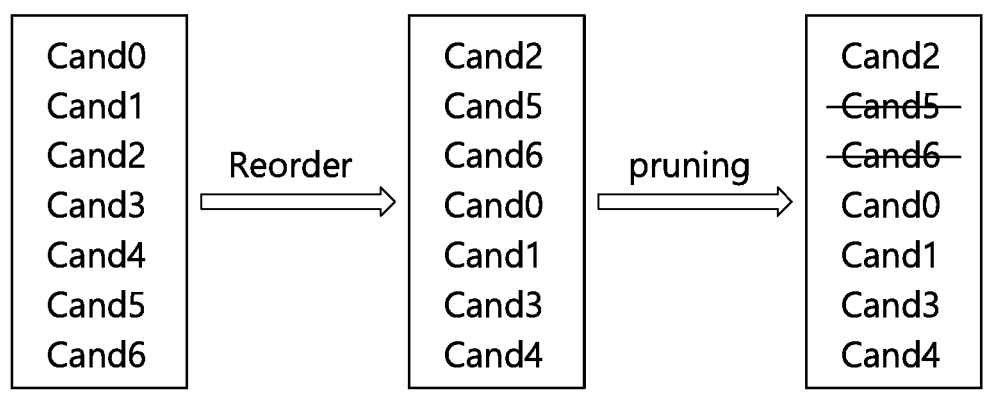
FIG. 14 represents an example of removing a merge candidate including a redundant motion information with respect to the modified merge candidate list.

FIG. 14 represents an example of removing a merge candidate including a redundant motion information with respect to the modified merge candidate list. Referring to FIG. 14, in a case where the modified merge candidate list is constructed with the merge candidates of the reordered order, the merge candidates including the same motion information may have the same template-based cost, and the merge candidates may be reordered in a consecutive order and be included in the modified merge candidate list. For example, referring to FIG. 14, a merge candidate Cand2, a merge candidate Cand5, and a merge candidate Cand6 may be merge candidates including the same motion information. In this case, the encoding device/decoding device may check whether there are merge candidates including the same motion information, and in a case where there are the merge candidates including the same motion information, the merge candidate except the first merge candidate in order among the merge candidates may be removed from the modified merge candidate list. The process of checking whether there are merge candidates including the same motion information may be referred to as a pruning check.

By performing the above-described pruning check, it is possible to improve the coding efficiency. Meanwhile, the pruning check may be performed only on the reordered merge candidate. That is, in a case where the reordering process has been performed on the merge candidates of the merge candidate list, the determination of whether there is the merge candidate including the same motion information may be made only on the motion information of the reordered merge candidate. Through this, in the pruning check process, only the process to compare the reordered merge candidate with the merge candidate coming in order before the reordered merge candidate may be performed, and there is an advantage that the computational complexity is decreased.

Further, in a case where the modified merge candidate list is constructed in the merge candidate order of the existing merge candidate list as it is, the pruning check with all the other merge candidates may be performed on each of the merge candidates, or only the pruning check process between the refine merge candidate and the merge candidate other than the refine merge candidate may be performed.

Meanwhile, in a case where the merge candidate is removed through the pruning check process, the number of the merge candidates of the modified merge candidate list may be less than the maximum number. In this case, there may be proposed a method in which by adding a new merge candidate, various motion informations are used as the merge candidate for the current block. For example, a method of adding a merge candidate to be described later may be considered.

For example, the merge candidate combined bi-pred which has been derived based on the reordered merge candidates may be added to the modified merge candidate list. Since the merge candidate combined bi-pred is derived based on the merge candidate which has been reordered based on the costs of the merge candidates, it may be derived as a candidate different from the merge candidate combined bi-pred included in the existing merge candidate list. Further, the merge candidate including the motion information of a sub-block unit may be removed from the merge candidates for deriving the merge candidate combined bi-pred. That is, the merge candidate combined bi-pred may not be derived based on the merge candidate including the motion information of a sub-block unit.

Further, as another example, a zero vector may be added to the modified merge candidate list as the merge candidate.

Further, as another example, the modified merge candidate which has been derived based on the refine merge candidate may be added to the modified merge candidate list. The modified merge candidate may be derived as described later.

Figure 15:
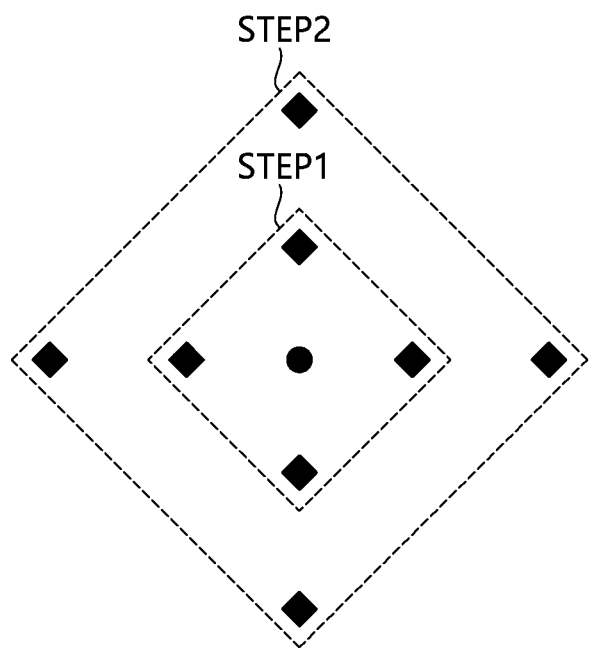
FIG. 15 illustratively represents a position which is indicated by the modified merge candidate that is derived based on the refine merge candidate.

FIG. 15 illustratively represents a position which is indicated by the modified merge candidate that is derived based on the refine merge candidate.

For example, the modified merge candidate may be derived based on an equation as follows:

$$MV = RefinedMV + (DeltaMV << Scale), \quad \text{[Equation 8]}$$

where MV represents the motion vector of the modified merge candidate, and RefinedMV represents the motion vector of the refine merge candidate. DeltaMV represents a position of +−1 in an integer pel unit based on the motion vector of the refine merge candidate. The DeltaMV may be scaled as shown in Equation 8.

When it is supposed that an object in an image moves at a constant speed, L0 motion information and L1 motion information may be constructed in opposite directions of X-Y coordinates as follows:

TABLE 2

| L0 (1, 0), (0, −1), (−1, 0), (0, 1) |
| L1 (−1, 0), (0, 1), (1, 0), (0, −1) |

For this, it is possible to determine L0 and L1 pair based on whether it is True-Bi (in a case where the reference pictures of L0 and L1 are in the opposite directions with the current picture as a reference, it is referred to as True-Bi).

Referring to FIG. 15, the range of the position which the motion vector of the modified merge candidate indicates may be derived based on the scale. STEP1 shown in FIG. 15 may represent 1-integer-pel, and STEP2 may represent 2-integer-pel. It may be determined base on the scale value whether the motion vector of the modified merge candidate is derived as a motion vector which indicates the position within 1-integer-pel range around the position which the motion vector of the refine merge candidate indicates, or as a motion vector which indicates the position within 2-integer-pel range around the position which the motion vector of the refine merge candidate indicates. Meanwhile, the position which the motion vector of the modified merge candidate shown in FIG. 15 indicates is merely an example, and there may be proposed an example in which the motion vector of the refine merge candidate is deformed to STEP1 . . . N, or an example in which it is deformed to a Sub-Pel or a Quarter-Pel unit. Further, although FIG. 15 illustrates the modification of a diamond shape of the motion vector, other modification to any shape may be possible.

Meanwhile, although the cost of the merge candidate for the reordering and refine processes with respect to the merge candidate list may be derived based on the template as described above, it may be derived through a bi-lateral matching method as described later.

Figure 16:
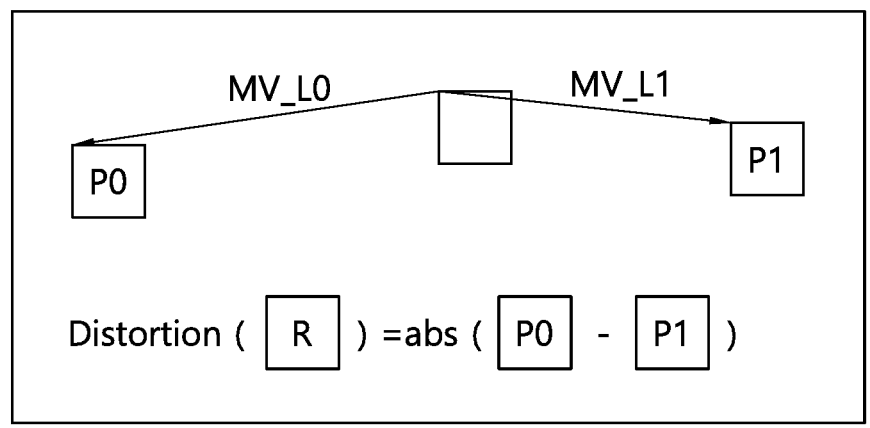
FIG. 16 represents an example of deriving a cost of a merge candidate through the bi-lateral matching method.

FIG. 16 represents an example of deriving a cost of a merge candidate through the bi-lateral matching method. Referring to FIG. 16, the cost of the merge candidate may be derived as the SAD between corresponding samples of a reference block P0 which L0 motion information of the merge candidate indicates and a reference block P1 which L1 motion information of the merge candidate indicates.

Meanwhile, in a case where the merge candidate includes uni-prediction motion information, that is, the merge candidate includes only L0 motion information or includes only L1 motion information, the encoding device/decoding device may derive the merge candidate as bi-prediction motion information, and may derive the cost for the merge candidate based on the derived bi-prediction motion information.

Figure 17:
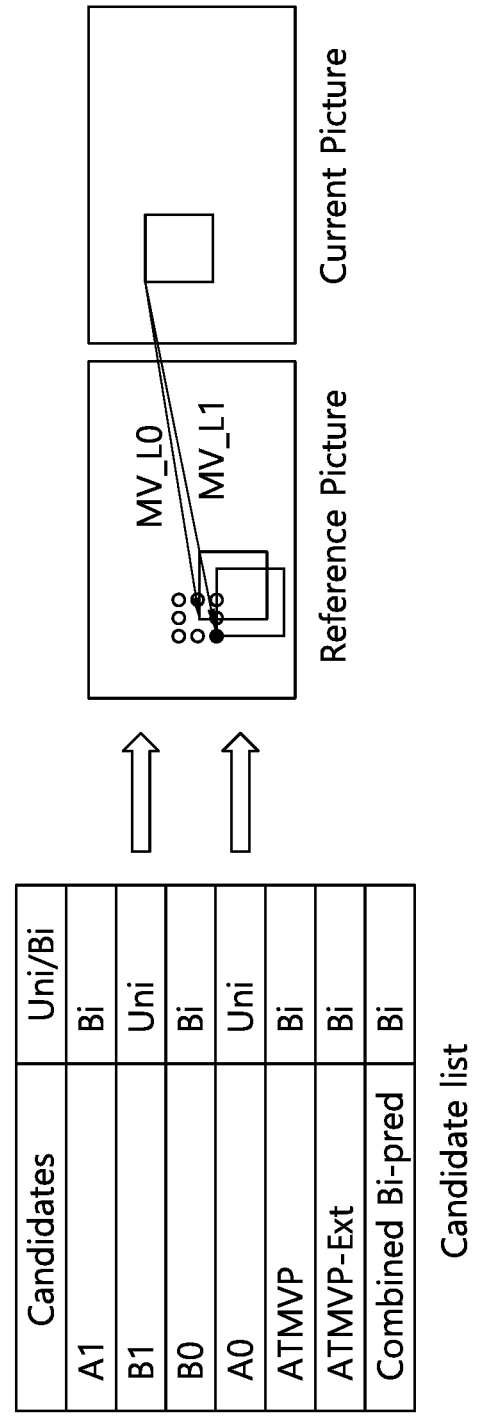
FIG. 17 represents an example of deriving bi-prediction motion information for a merge candidate including uni-prediction motion information.

FIG. 17 represents an example of deriving bi-prediction motion information for a merge candidate including uni-prediction motion information.

Specifically, for example, the merge candidate may include the L0 motion information, and the L0 reference block may be derived based on the L0 motion information. In this case, the encoding device/decoding device may derive, as the L1 reference block of the current block, the reference block whose cost with the L0 reference block among the reference blocks within a search range, which the motion vector L0 (MVL0) of the L0 motion information indicates, is minimum. Here, the search range may be derived as 8 neighboring positions within a 1-integer-pel range around the position which the motion vector L0 indicates. Alternatively, the search range may be derived as neighboring positions within a half-pel range around the position which the motion vector L0 indicates.

Further, the merge candidate may include the L1 motion information, and the L1 reference block may be derived based on the L1 motion information. In this case, the encoding device/decoding device may derive, as the L0 reference block of the current block, the reference block whose cost with the L1 reference block among the reference blocks within a search range, which the motion vector L1 (MVL1) of the L1 motion information indicates, is minimum. Here, the search range may be derived as 8 neighboring positions within a 1-integer-pel range around the position which the motion vector L1 indicates. Alternatively, the search range may be derived as neighboring positions within a half-pel range around the position which the motion vector L1 indicates. The search range and the number of the neighboring positions may be varied differently from the above-described example.

Meanwhile, the bi-prediction motion information for the merge candidate which has been derived for cost of the merge candidate may be used for the reordering process of the merge candidate list and/or the merge candidate addition of the merge candidate list. Further, the cost for deriving the bi-prediction motion information and the cost in the reordering process of the merge candidate list may be derived through different methods from each other. For example, the cost for deriving the bi-prediction motion information may be derived through the above-described bi-lateral matching method, and the cost for merge candidate for the reordering process may be derived through the above-described template matching method.

Meanwhile, the above-described refine process may be performed based not on the cost for the merge candidate, which has been derived through the template, but on the cost derived through a decoder side motion vector refinement (DMVR). The DMVR will be described in detail later.

Figure 18:
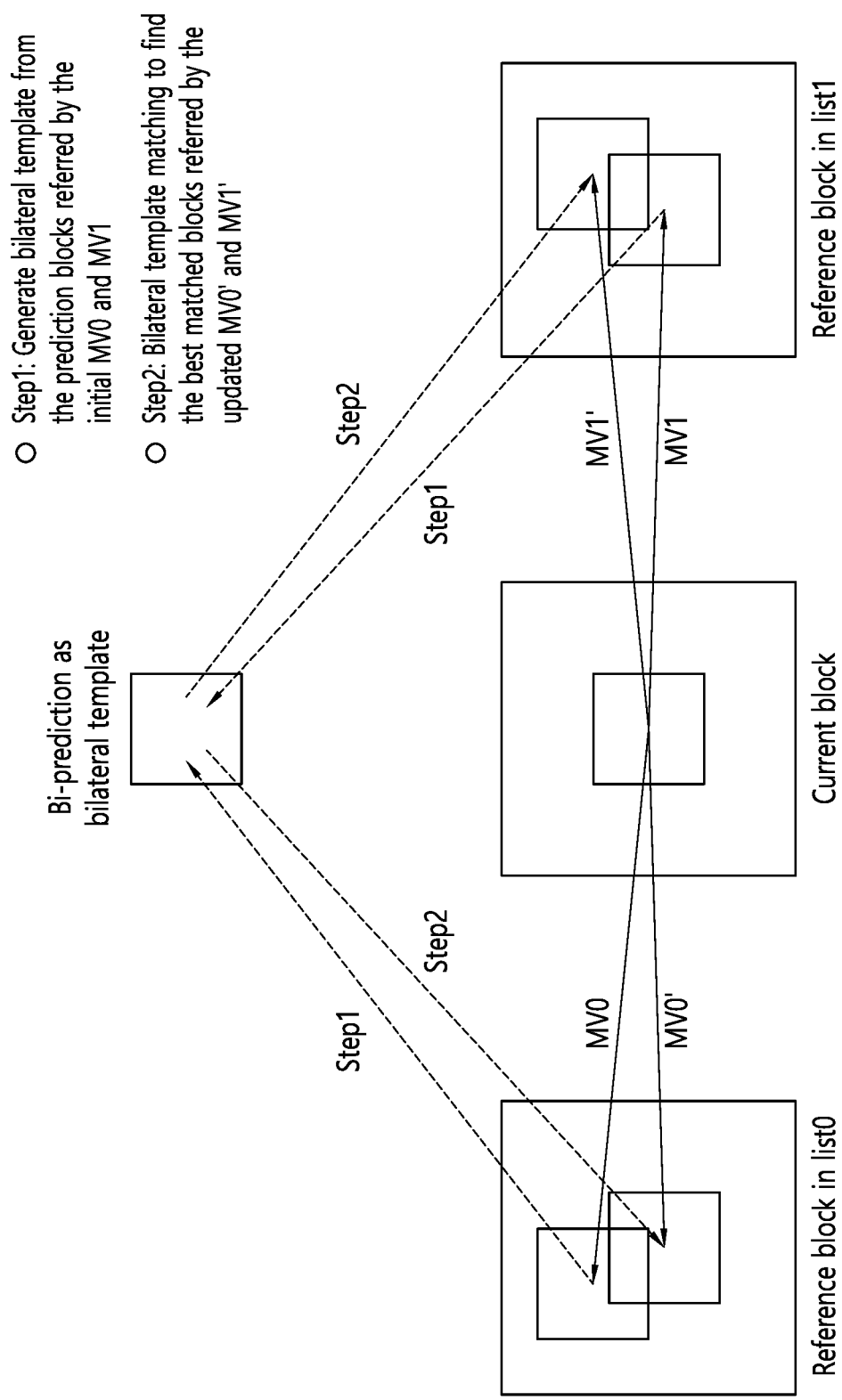
FIG. 18 represents an example of performing the refine process for the merge candidate through the DMVR.

FIG. 18 represents an example of performing the refine process for the merge candidate through the DMVR. Referring to FIG. 18, the encoding device/decoding device may derive an L0 reference block which L0 motion information included in the merge candidate indicates, and an L1 reference block which L1 motion information indicates, and may derive a refine L0 reference block and a refine L1 reference block which have the smallest SAD, from among L0 reference blocks included in the neighboring region of the L0 reference block and L1 reference blocks included in the neighboring region of the L1 reference block. The refine L0 motion information indicating the refine L0 reference block and the refine L1 motion information indicating the refine L1 reference block may be derived as the refine merge candidate. That is, the refine merge candidate may include the refine L0 motion information and the refine L1 motion information. The refine process through the DMVR may be applied to any merge candidate of the current block. Further, the cost in the reordering process of the merge candidate list may be derived in a method different from the method of deriving through the DMVR. For example, the cost for the merge candidate for the reordering process may be derived through the above-described bi-lateral matching method, and the refine process may be performed through the DMVR.

Figure 19:
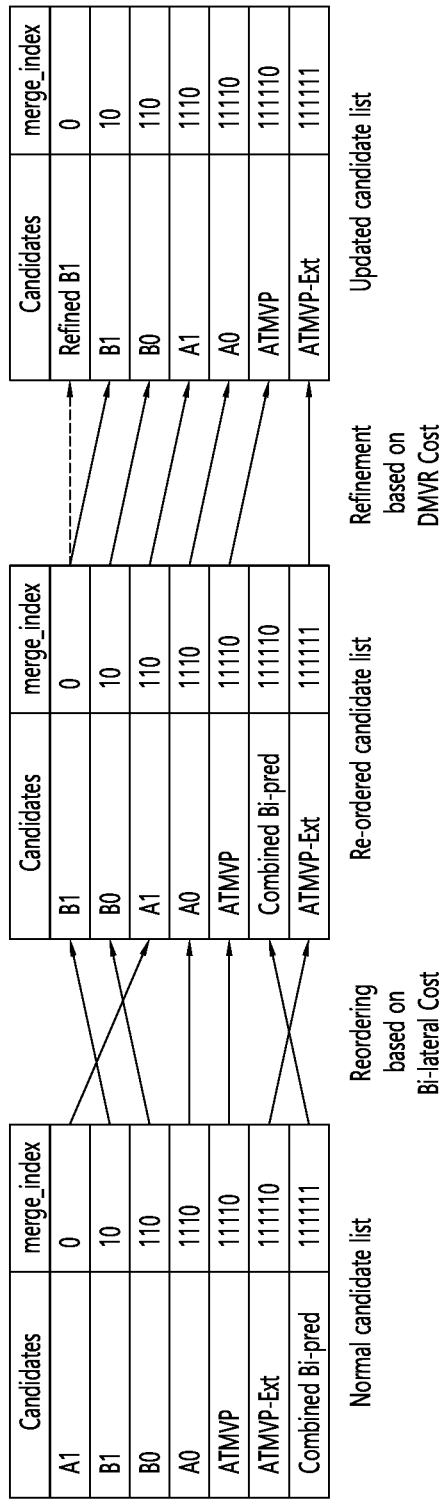
FIG. 19 represents an example of reordering the merge candidate list through the bi-lateral matching method, and deriving modified merge candidate list including the refine merge candidate derived through the DMVR.

FIG. 19 represents an example of reordering the merge candidate list through the bi-lateral matching method, and deriving modified merge candidate list including the refine merge candidate derived through the DMVR.

For example, the costs for the merge candidates of the current block may be derived through the above-described bi-lateral matching method, and the merge candidate list may be reordered based on the costs for the merge candidates, so that the merge index for the optimal merge candidate for the current block may be allocated with a small value. Referring to FIG. 19, a cost of a merge candidate B1 may be smallest among costs of merge candidates, and a cost of a merge candidate B0 may be less than that of a merge candidate A1. Further, a cost of a merge candidate Combined Bi-pred may be less than that of a merge candidate ATMVP-Ext. In this case, the merge candidate B1 may be reordered to be first in order in the merge candidate list; the merge candidate B0, to be second in order in the merge candidate list; and the merge candidate A1, to be third in order in the merge candidate list. The merge candidate Combined Bi-pred may be reordered to come in order before the merge candidate ATMVP-Ext. As the merge candidate list is reordered based on the costs for the merge candidates, the merge index for the optimal merge candidate for the current block may be allocated with a small value.

Further, motion information including a refine motion vector derived by performing refinement based on an optimal candidate, that is, a merge candidates reordered from small to large merge index values, may be added as a merge candidate, through which a new candidate with a high accuracy may be used in the prediction of the current block. For example, referring to FIG. 19, the refinement may be performed on the merge candidate B1 which has been reordered to be first in order, so that a refine merge candidate Refined B1 may be derived. The refinement for the merge candidate B1 may be performed through the above-described DMVR. Specifically, the L0 reference block which the L0 motion information of the merge candidate B1 indicates, and the L1 reference block which the L1 motion information of the merge candidate B1 indicates may be derived, and the refine L0 reference block and the refine L1 reference block which have the smallest SAD, may be derived from among the L0 reference blocks included in the neighboring region of the L0 reference block and the L1 reference blocks included in the neighboring region of the L1 reference block. The refine L0 motion information indicating the refine L0 reference block and the refine L1 motion information indicating the refine L1 reference block may be derived as the refine merge candidate Refined B1. That is, the refine merge candidate Refined B1 may include the refine L0 motion information and the refine L1 motion information.

The refine merge candidate Refined B1 may be reordered to be first in order. Meanwhile, in a case where the refine merge candidate Refined B1 is added to the merge candidate list, the number of the merge candidates becomes greater than the maximum number, and thus any one of the merge candidates may be removed from the merge candidate list. For example, since the accuracy of the motion information generated through the combination becomes low, the merge candidate Combined Bi-pred may be removed from the merge candidate list of the current block.

Meanwhile, in a case where the refine process through the DMVR is performed on the merge candidate list in which the refine merge candidate derived through the above-described template matching method or the bi-lateral matching method is included, it may occur that the refine merge candidate is refined again through the DMVR. In a case where the DMVR is performed on the refine merge candidate, wrong motion information may be derived. Therefore, there may be proposed a method in which the DMVR is not performed on the refine merge candidate which has been derived through the above-described template matching method or bi-lateral matching method.

Figure 20:
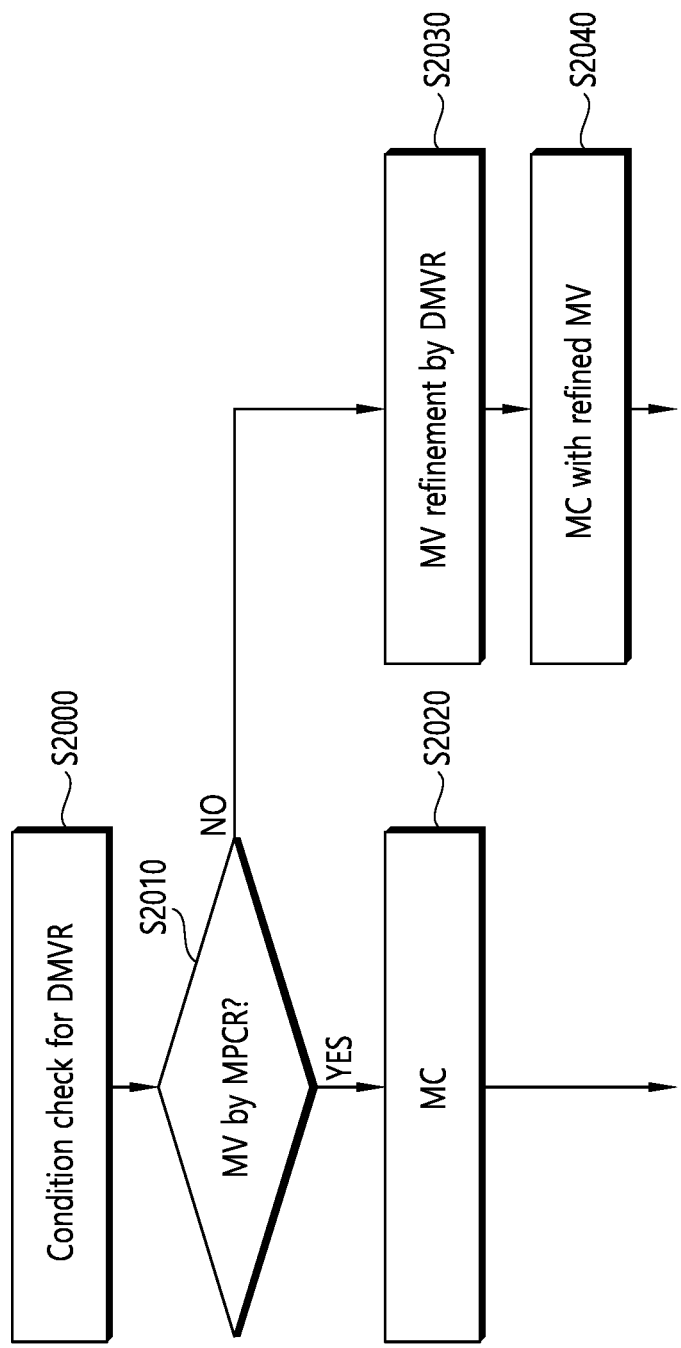
FIG. 20 illustratively represents a method of performing the DMVR on a merge candidate list including a refine merge candidate.

FIG. 20 illustratively represents a method of performing the DMVR on a merge candidate list including a refine merge candidate. Referring to FIG. 20, the encoding device/decoding device may check whether the DMVR is performed on the corresponding merge candidate (S2000). The encoding device/decoding device may determine whether the motion information of the corresponding merge candidate is refine motion information (S2010). In a case where the motion information of the corresponding merge candidate is the refine motion information, the encoding device/decoding device may derive the motion information of the current block based on the merge candidate list including the corresponding merge candidate (S2020).

Meanwhile, in a case where the motion information of the corresponding merge candidate is not the refine motion information, the encoding device/decoding device may perform the refine process on the corresponding merge candidate through the above-described DMVR (S2030). Specifically, the encoding device/decoding device may derive the L0 reference block which the L0 motion information of the corresponding merge candidate indicates, and the L1 reference block which the L1 motion information of the corresponding merge candidate indicates, and may derive the refine L0 reference block and the refine L1 reference block which have the smallest SAD, from among the L0 reference blocks included in the neighboring region of the L0 reference block and the L1 reference blocks included in the neighboring region of the L1 reference block. The refine L0 motion information indicating the refine L0 reference block and the refine L1 motion information indicating the refine L1 reference block may be derived as the refine merge candidate. That is, the refine merge candidate may include the refine L0 motion information and the refine L1 motion information. The encoding device/decoding device may derive the motion information of the current block based on the modified merge candidate list including the refine merge candidate (S2040).

Meanwhile, although as in the above-described embodiments, the merge candidate list of the current block is reordered, and then the refine process may be performed on the reordered merge candidate list, the refine process may be performed first on the merge candidate list.

Figure 21:
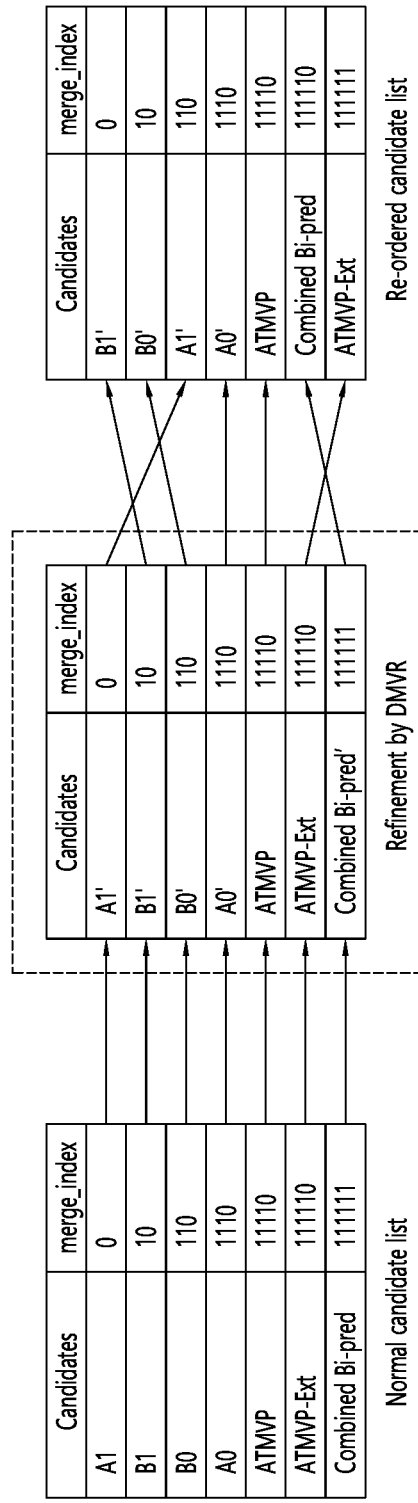
FIG. 21 represents an example of deriving a refine merge candidate by performing the refine process, and reordering merge candidates including the refine merge candidate.

FIG. 21 represents an example of deriving a refine merge candidate by performing the refine process, and reordering merge candidates including the refine merge candidate.

Referring to FIG. 21, the encoding device/decoding device may derive refine merge candidates for a merge candidate A1, a merge candidate B1, a merge candidate B0, a merge candidate A0, and a merge candidate Combined Bi-pred through the above-described DMVR. For example, the encoding device/decoding device may derive a refine merge candidate A1' for the merge candidate A1, a refine merge candidate B1' for the merge candidate B1, a refine merge candidate B0' for the merge candidate B0, a refine merge candidate A0' for the merge candidate A0, and a refine merge candidate Combined Bi-pred for the merge candidate Combined Bi-pred, through the DMVR. The refine process may not be performed on the merge candidate ATMVP and the merge candidate ATMVP-Ext among the merge candidates, which include motion information of a sub-block unit. Meanwhile, the merge candidate from which the refine merge candidate shown in FIG. 21 is derived, e.g., the merge candidate from which the refine merge candidate is derived, may be set variously in terms of the number and the kind thereof.

Referring to FIG. 21, in a case where the refine merge candidates are derived, the merge candidates for the refine merge candidates may be replaced with the refine merge candidates. After this, the costs for the merge candidates including the refine merge candidates may be derived, and the merge candidates may be reordered based on the costs. The cost for each of the merge candidates may be derived based on the template of the current block and the template of the reference block for the corresponding merge candidate (template matching method). Alternatively, the cost of each of the merge candidates may be derived based on the L0 reference block which the L0 motion information of the corresponding merge candidate indicates, and the L1 reference block which the L1 motion information indicates (bi-lateral matching method).

Meanwhile, in a case where there is a light source or a shadow in an image, a local illumination change occurs in an area affected thereby. In this case, when prediction for an object in a block is performed, prediction performance decreases due to difference in illumination between a current block of a current picture and a reference block of a reference picture. According to a general motion estimation/compensation algorithm used in a video encoding/decoding process, that is because such local illumination change cannot be compensated. Contrarily, in a case where such local illumination change is compensated, more accurate prediction may be performed.

Specifically, the efficiency of prediction may be increased by predicting the current block based on the reference block compensated by applying illumination compensation, and in this case, the residual between the predicted current block and the original block is decreased, so that data allocated to the residual signal may be decreased and the coding efficiency may be improved. The method in which the efficiency of the prediction is increased by providing the illumination compensation to the reference block like this may be called local illumination compensation (LIC). The LIC, and illumination compensation (IC) may be used in place of each other.

An LIC flag for indicating whether the LIC is applied, and an LIC parameter for applying the LIC may be used as additional information for the LIC. The LIC parameter may include the scaling factor a and an offset b as described later. For example, in a case where the value of the LIC flag is 1 (that is, in case where the value of the LIC flag is 'true'), the LIC flag may represent that the LIC is applied to the current block, and in a case where the value of the LIC flag is 0 (that is, in case where the value of the LIC flag is 'false'), the LIC flag may represent that the LIC is not applied to the current block.

In order to increase the efficiency of the LIC, it is important to increase the prediction performance while minimizing the additional information. For example, in order to minimize the additional information, the determination of whether to apply the LIC may be made in view of a block size or a partition type, such as the LIC may be applied restrictively to the CU having a certain size or the PU having a partition type of 2N×2N. Further, as described above, in a case where the QTBT structure is used, the CUs of various sizes may be used without distinction of the CU, the PU, and the TU, and thus the prediction accuracy may be increased by applying the LIC appropriately to the corresponding structure.

The LIC may be based on a linear model, and for example, may be based on an equation as follows:

$$\Sigma y = a^* \Sigma x + b, \qquad \text{[Equation 9]}$$

where a and b, the LIC parameters, represent a scaling factor and an offset respectively, and x and y represent a neighboring reference sample value of the reference block and a neighboring reference sample value of the current block, respectively which are used to derive the LIC parameter. Alternatively, x and y may represent a reference sample value within the reference block and a sample value of the original block within the original picture corresponding to the current block, respectively which are used to derive the LIC parameter. The reference block may be indicated based on the motion vector of the current block. In the LIC parameter derivation process, the difference between both sides of the foregoing equation may be regarded as an error (E), and the LIC parameters a and b which satisfy the condition under which the error is minimized may be obtained and applied to the reference block. That is, after the LIC parameter is derived, the scaling factor and the offset may be applied on a sample basis to the reference samples of the reference block, so that the modified (illumination-compensated) reference samples may be derived.

Since the LIC parameters a and b obtained by foregoing Equation 9 are values, at the end, which minimize the error of the both sides, the equation for obtaining the LIC parameter may be represented as follows:

$$E(a,b) = \Sigma_i (y_i - ax_i - b)^2 + \lambda(a-1)^2, \qquad \text{[Equation 10]}$$

where E(a, b) represents values of a and b which minimize the error, i represents indexing of each sample, and λ(lambda) represents a control parameter. The λ may be predetermined, or, for example, may be derived based on x. In one example, it may be derived as follows: $\lambda = (\Sigma_i x_i x_i) \gg 7)$ and as another example, the λ may be set as 0, so that the latter part of Equation 10 may be omitted. This is the same to equations described later.

Foregoing equation 10 may be summarized as follows:

$$\begin{pmatrix} \sum_i x_i x_i + \lambda & \sum_i x_i \\ \sum_i x_i & \sum_i 1 \end{pmatrix} \begin{pmatrix} a \\ b \end{pmatrix} = \begin{pmatrix} \sum_i x_i y_i + \lambda \\ \sum_i y_i \end{pmatrix} \qquad \text{[Equation 11]}$$

The IC parameters a and b may be derived based on foregoing Equation 11 as follows:

$$a = \frac{N\sum_i x_i y_i - \sum_i x_i \sum_i y_i + \lambda}{N\sum_i x_i x_i - \sum_i x_i \sum_i x_i + \lambda} \quad \text{[Equation 12]}$$

$$b = \sum_i y_i - a * \sum_i x_i \quad \text{[Equation 13]}$$

In Equation 12, N represents a normalization parameter. Here, N may be derived from $$\sum_i 1$$

of forgoing Equation 11. For example, the N may be determined based on the size of the current block (or reference block), and, for example, it may be a value, such as width*area or width+area of the corresponding block. Alternatively, it may be a value, such as width or area +n, or the like of the current block.

Meanwhile, the merge candidate may include the LIC flag, and the LIC flag of the merge candidate may be generated by predetermined rules. The LIC flag of the merge candidate may be set to be the same as the LIC flag of the neighboring block for the merge candidate. For example, the spatial merge candidate may include the LIC flag having the same value as that of the LIC flag of the spatial merge candidate block for the spatial merge candidate.

Meanwhile, the LIC flag of the refine merge candidate derived through the refine process may be set to be the same as the LIC flag of the merge candidate which has been referred to for deriving the refine merge candidate. Further, in a case where the motion vector of the refine merge candidate is the same as that of the merge candidate, the refine merge candidate may not be added to the merge candidate list.

In addition, in a case where the merge candidates derived based on the neighboring block of the current block includes at least one merge candidate which has the LIC flag of which value is TRUE, the refine merge candidate which includes the LIC flag of which value is opposite to that of the LIC flag of the merge candidate may be added to the merge candidate list. That is, in a case where the merge candidates includes at least one merge candidate which has the LIC flag of which value is TRUE, the refine merge candidate which includes the motion vector being the same as that of the merge candidate, and the LIC flag of which value is opposite to that of the LIC flag of the merge candidate may be added to the merge candidate list. Further, the determination of whether the refine merge candidate, which includes the LIC flag having a value opposite to that of the LIC flag of the merge candidate, is derived may be made based on the number of the merge candidates having the LIC flag of which value is 'TRUE.' For example, in a case the number of the merge candidates having the LIC flag of which value is 'TRUE' is equal to or greater than two, the refine merge candidate including LIC flag of which value is opposite to that of the LIC flag of the merge candidate may be derived. Further, the cost which has been derived through the above-described template matching method, bi-lateral matching method and/or DMVR may be controlled by a weighting factor for the LIC based on a predetermined conditions, and the number of the merge candidates including the LIC flag which has been set 'TRUE' may be determined based on the predetermined conditions.

Figure 22:
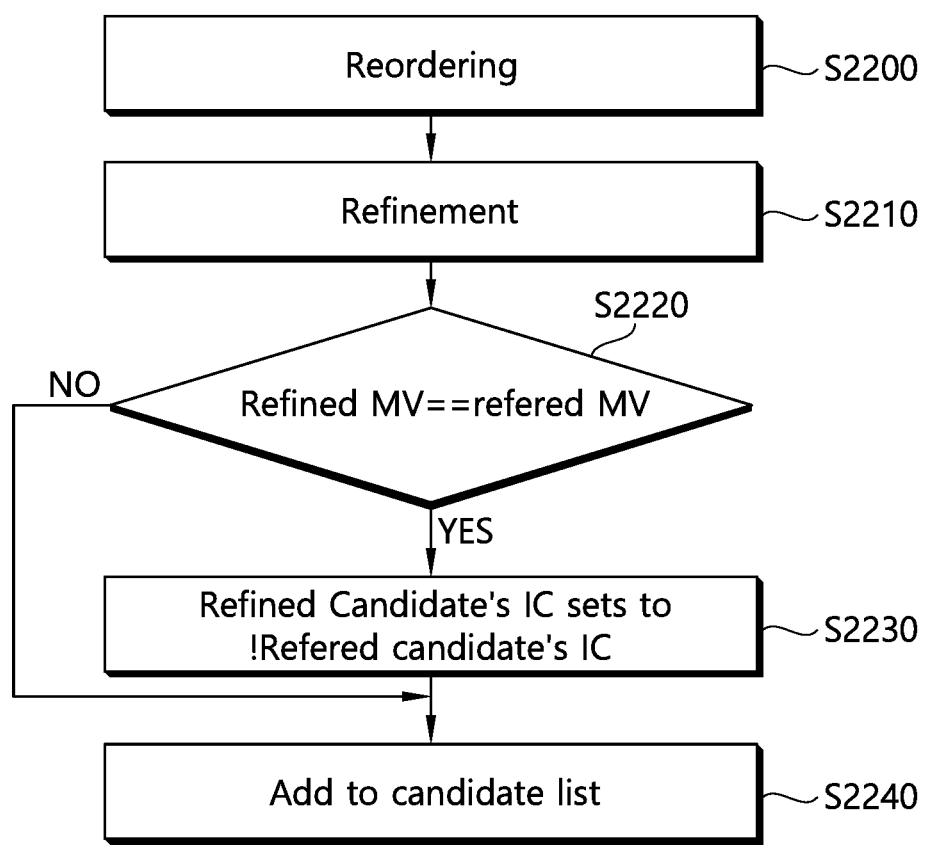
FIG. 22 represents an example of adding the refine merge candidate including the LIC flag to the merge candidate list.

FIG. 22 represents an example of adding the refine merge candidate including the LIC flag to the merge candidate list. Referring to FIG. 22, the encoding device/decoding device may reorder the merge candidates in the merge candidate list of the current block (S2200). The encoding device/decoding device may derive the costs of the merge candidates, and reorder the merge candidates in an order from small to large costs.

The encoding device/decoding device may perform the refinement on the predetermined merge candidate (S2210). The encoding device/decoding device may derive the refine merge candidate for the predetermined merge candidate.

The encoding device/decoding device may determine whether the motion vector of the refine merge candidate is the same as that of the predetermined merge candidate (S2220).

In a case where the motion vector of the refine merge candidate is the same as that of the predetermined merge candidate, the encoding device/decoding device may set the value of the LIC flag of the refine merge candidate to be opposite to that of the predetermined LIC flag (S2230).

The encoding device/decoding device may add the refine merge candidate to the merge candidate list of the current block (S2240). Meanwhile, in a case where the motion vector of the refine merge candidate is not the same as that of the predetermined merge candidate, the encoding device/decoding device may add the refine merge candidate to the merge candidate list of the current block.

Figure 23:
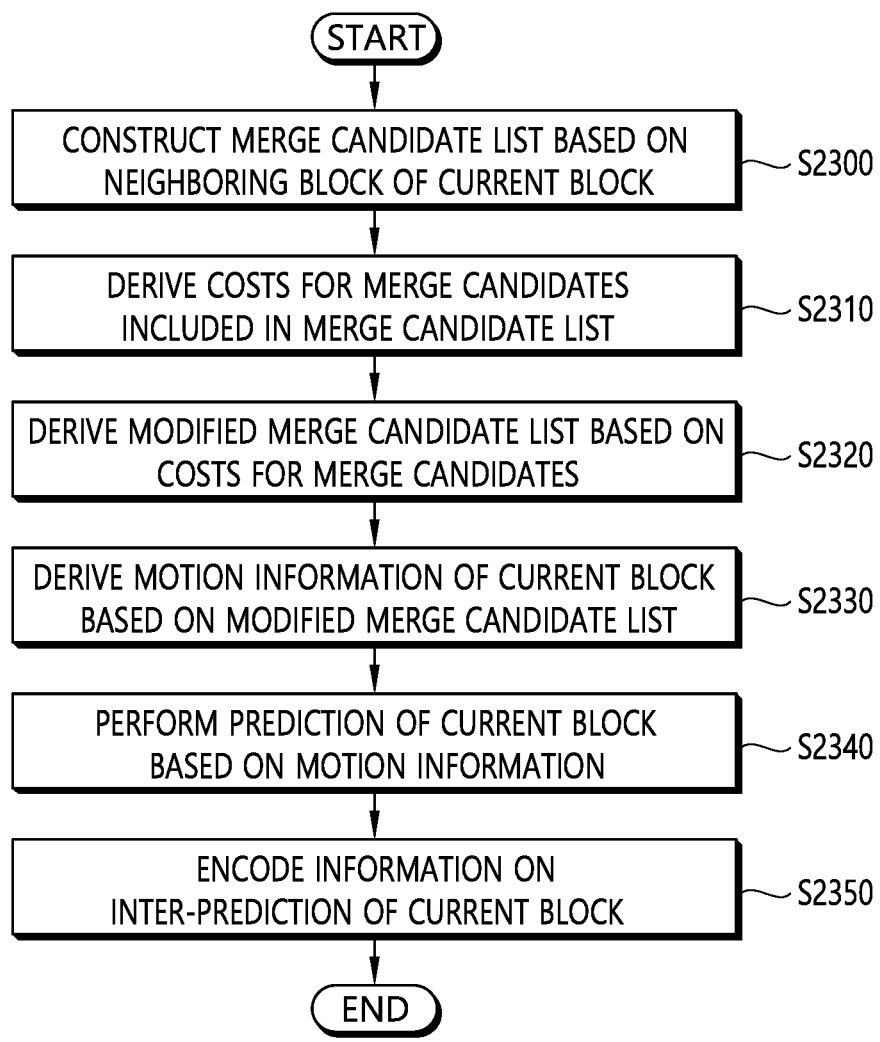
FIG. 23 schematically represents a video encoding method by an encoding device according to the present disclosure.

FIG. 23 schematically represents a video encoding method by an encoding device according to the present disclosure. The method disclosed in FIG. 23 may be performed by the encoding device disclosed in FIG. 1. Specifically, for example, S2300 to S2340 of FIG. 23 may be performed by the predictor of the encoding device, and S2350 may be performed by the entropy encoder of the encoding device.

The encoding device constructs the merge candidate list based on the neighboring block of the current block (S2300). The encoding device may derive the motion information of the neighboring block as the merge candidate, and may construct the merge candidate list including the merge candidate. Further, the encoding device may derive, as the merge candidate of the current block, the motion information derived by combining the motion informations of the neighboring blocks, and may construct the merge candidate list including the merge candidate. Here, the neighboring block may include the spatial neighboring block and the temporal neighboring block. The spatial neighboring block may include the left neighboring block, the top neighboring block, the top-left neighboring block, the bottom-left neighboring block, and the top-right neighboring block of the current block, and the temporal neighboring block may include the co-located block including a position in the reference picture corresponding to the bottom-right position or central position of the current block, and the co-located block indicated by the motion information of the predetermined neighboring block of the current block. If a size of the current block is W×H, and an x component of the top-left sample position of the current block is 0 and a y component thereof is 0, the left neighboring block may be a block including a top-left sample at coordinates (−1, H−1); the top neighboring block, a block including a top-left sample at coordinates (W−1, −1); the top-right neighboring block, a block including a top-left sample at coordinates (W, −1); the bottom-left neighboring block, a block including a top-left sample at coordinates (−1, H); and the top-left neighboring block, a block including a top-left sample at coordinates (−1, −1).

Further, the encoding device may construct the merge candidate list including merge candidates of the maximum candidate number based on the neighboring block. For example, the maximum candidate number may be seven. Further, for example, the merge candidate list may be constructed in the order of foregoing Table 1.

Meanwhile, the encoding device may determine which one mode of a skip mode, a merge mode, and an adaptive motion vector prediction (AMVP) mode is applied to the current block, and may generate information on the inter-prediction of the current block. The information on the inter-prediction may represent which one mode of a skip mode, a merge mode, and an adaptive motion vector prediction (AMVP) mode is applied to the current block.

The encoding device may derive the costs for the merge candidates included in the merge candidate list (S2310). The encoding device may derive the costs for the merge candidates.

For example, the cost of the merge candidate may be derived as the sum of absolute differences (SAD) between the template of the current block and the template of the merge candidate. That is, the cost may be derived as the sum of absolute differences (SAD) between the corresponding samples of the template of the current block and the template of the merge candidate. The cost may be derived based on foregoing Equation 1.

Here, the template of the current block may include a top template and a left template, and the cost may be derived as the sum of the top cost and the left cost. The top cost may be derived as the SAD between the top template of the current block and the top template of the merge candidate, and the left cost may be derived as the SAD between the left template of the current block and the left template of the merge candidate. Alternatively, the top cost may be derived as the value obtained by normalizing the SAD between the top template of the current block and the top template of the merge candidate with the size of the top template, and the left cost may be derived as the value obtained by normalizing the SAD between the left template of the current block and the left template of the merge candidate with the size of the left template. The left cost and the top cost may be derived based on foregoing Equation 5. Alternatively, the top cost may be derived as the value obtained by upscaling the SAD between the top template of the current block and the top template of the merge candidate and normalizing the upscaled SAD with the size of the top template, and the left cost may be derived as the value obtained by upscaling the SAD between the left template of the current block and the left template of the merge candidate and normalizing the upscaled SAD with the size of the left template. The left cost and the top cost may be derived based on foregoing Equation 6.

When a size of the current block is W×H, and an x component of a top-left sample position of the current block is 0 and a y component thereof is 0, the template of the current block may include a top-left sample at coordinates (−n, 0), may include the left template having a size of n×H and a top-left sample at (0, −n), and may be derived as the top template having a size of W×n. Here, the n may represent the value which the size information on the template represents. The encoding device may determine the size for the template, and generate the size information on the template.

Alternatively, the template of the current block may be variable according to the neighboring block for the merge candidate. For example, when a size of the current block is W×H, and an x component of a top-left sample position of the current block is 0 and a y component thereof is 0, the template of the current block for a merge candidate indicating motion information of the top neighboring block may include a top-left sample at coordinates (−n, 0), may include the left template having a size of n×H and a top-left sample at (−n, −n), and may be derived as the top template having a size of (n+W−1)×n. Further, the template of the current block for a merge candidate indicating motion information of the left neighboring block may include a top-left sample at coordinates (−n, −n), may include the left template having a size of n×(n+H−1) and a top-left sample at coordinates (0, −n), and may be derived as the top template having a size of W×n. Further, when a size of the current block is W×H, and an x component of a top-left sample position of the current block is 0 and a y component thereof is 0, the template of the current block for a merge candidate other than a merge candidate indicating motion information of the top neighboring block and a merge candidate indicating motion information of the left neighboring block may include a top-left sample at coordinates (−n, 0), may include the left template having a size of n×H and a top-left sample at (0, −n), and may be derived as the top template having a size of W×n. Here, the n may represent the value which the size information on the template represents. The encoding device may determine the size for the template, and generate the size information on the template.

Meanwhile, as another example, the cost of the merge candidate may be derived as the sum of absolute differences (SAD) between the L0 reference block of the merge candidate and the L1 reference block of the merge candidate. That is, the cost may be derived as the sum of absolute differences (SAD) between the corresponding samples of the L0 reference block and the L1 reference block. Here, the L0 reference block may be a reference block which L0 motion information of the merge candidate indicates, and the L1 reference block may be a reference block which L1 motion information of the merge candidate indicates.

Meanwhile, when the merge candidate is uni-prediction motion information including L0 motion information, the motion information that indicates a reference block among reference blocks within a search range, which has a minimum cost with the L0 reference block which the L0 motion information indicates, may be derived as the L1 motion information. After this, the cost of the merge candidate may be derived as the cost between the L0 reference block and the L1 reference block which the L1 motion information indicates. Here, the search range may be a 1-integer-pel range around a position which the L0 motion information indicates. Alternatively, the search range may be a 2-integer-pel range around a position which the L0 motion information indicates. Alternatively, the search range may be a half-integer-pel range around a position which the L0 motion information indicates. Further, the search range may be set as a range other than the above-described examples.

Further, when the merge candidate is uni-prediction motion information including L1 motion information, the motion information that indicates a reference block among reference blocks within a search range, which has a minimum cost with the L1 reference block which the L1 motion information indicates, may be derived as the L0 motion information. After this, the cost of the merge candidate may be derived as the cost between the L1 reference block and the L0 reference block which the L0 motion information indicates. Here, the search range may be a 1-integer-pel range around a position which the L1 motion information indicates. Alternatively, the search range may be a 2-integer-pel range around a position which the L1 motion information indicates. Alternatively, the search range may be a half-integer-pel range around a position which the L1 motion information indicates. Further, the search range may be set as a range other than the above-described examples.

The encoding device derives the modified merge candidate list based on the costs for the merge candidates (S2320).

For example, the encoding device may derive the reordered merge candidate list by reordering the merge candidates in an order from small to large costs thereof, derive the refine merge candidate based on a predetermined merge candidate among the merge candidates, and derive the modified merge candidate list by adding the refine merge candidate to the reordered merge candidate list.

Alternatively, the encoding device may derive the modified merge candidate list by reordering the merge candidates in an order from small to large costs thereof. Alternatively, the encoding device may derive the refine merge candidate based on a predetermined merge candidate of the merge candidates of the merge candidate list, and may derive the modified merge candidate list by adding the refine merge candidate to the merge candidate list.

Meanwhile, the merge candidates may be derived as the predetermined merge candidate in the reordered order. Alternatively, the merge candidate among the merge candidates which has the smallest cost may be derived as the predetermined merge candidate.

Specifically, the refine merge candidate may be derived as follows.

For example, the encoding device may derive, from among templates of reference blocks within a search range, the template which has the smallest cost with the template of the current block, and may derive, as the refine merge candidate, the motion information which indicates the reference block of the derived template. Here, the search range may be a 1-integer-pel range around a position which motion information represented by the predetermined merge candidate indicates. Alternatively, the search range may be a 2-integer-pel range around a position which the motion information indicates. Alternatively, the search range may be a half-integer-pel range around a position which the motion information indicates. Further, the search range may be set as a range other than the above-described examples.

As another example, the encoding device may derive an L0 reference block and an L1 reference block among L0 reference blocks within an L0 search range and L1 reference blocks within an L1 search range, which have the smallest sum of absolute differences (SAD), as a refine L0 reference block and a refine L1 reference block, and may derive, as refine merge candidates, L0 motion information indicating the refine L0 reference block and L1 motion information indicating the refine L1 reference block. Here, the L0 search range may be a 1-integer-pel range around a position which L0 motion information of the predetermined merge candidate indicates, and the L1 search range may be a 1-integer-pel range around a position which the L1 motion information of the predetermined merge candidate indicates. Alternatively, the L0 search range may be a 2-integer-pel range around a position which the L0 motion information indicates, and the L1 search range may be a 2-integer-pel range around a position which the L1 motion information indicates. Alternatively, the L0 search range may be a half-integer-pel range around a position which the L0 motion information indicates, and the L1 search range may be a half-integer-pel range around a position which the L1 motion information indicates. Further, the search range may be set as a range other than the above-described examples.

As another example, the refine merge candidate may be derived as the merge candidate including a local illumination compensation (LIC) flag which has an opposite value to a value of an LIC flag of the predetermined merge candidate. The LIC flag may represent whether the LIC is applied to the current block. For example, in a case where the value of the LIC flag of the predetermined merge candidate is 1, the refine merge candidate may include the LIC flag of which value is 0. In a case where the value of the LIC flag of the predetermined merge candidate is 0, the refine merge candidate may include the LIC flag of which value is 1.

The refine merge candidate may be added to the modified merge candidate list in such an order that it comes before the predetermined merge candidate. Meanwhile, in a case where the refine merge candidate is added to the modified merge candidate list, the merge candidates of the modified merge candidate list may be reordered. For example, in a case where the refine merge candidate is a merge candidate which is first in order in the modified merge candidate list, the merge candidates other than the refine merge candidate may be reordered in an order of the merge candidate list.

Meanwhile, the encoding device may determine whether a merge candidate of the modified merge candidate list represents the same motion information as a merge candidate that comes in order before it. In a case where the merge candidate represents the same motion information as the merge candidate that comes in order before it, the merge candidate may be removed from the modified merge candidate list. The encoding device may make the determination for all the merge candidates of the modified merge candidate list as to whether one of them represents the same motion information as another one that comes in order before the one. Alternatively, the encoding device may make the determination for the refine merge candidate as to whether it represents the same motion information as a merge candidate that comes in order before it. Alternatively, the encoding device may make the determination for the reordered merge candidate as to whether it represents the same motion information as a merge candidate that comes in order before it. Here, the reordered merge candidate may be a merge candidate whose order in the merge candidate list is different from that in the reordered merge candidate list.

Meanwhile, in a case where the number of the merge candidates of the modified merge candidate list is greater than the maximum merge candidate number, the merge candidate for the largest cost may be removed from the modified merge candidate list. Alternatively, in a case where the number of the merge candidates of the modified merge candidate list is greater than the maximum merge candidate number, the last merge candidate in the merge candidate list may be removed from the modified merge candidate list. Alternatively, in a case where the number of the merge candidates of the modified merge candidate list is greater than the maximum merge candidate number, the predetermined merge candidate for the refine merge candidate may be removed from the modified merge candidate list.

Meanwhile, in a case where the number of the merge candidates of the modified merge candidate list is less than the maximum merge candidate number, the merge candidate which is derived based on a merge candidate reordered in a different order from that of the merge candidate list may be added to the modified merge candidate list. Alternatively, in a case where the number of the merge candidates of the modified merge candidate list is less than the maximum merge candidate number, the merge candidate representing a zero vector may be added to the modified merge candidate list. Alternatively, in a case where the number of the merge candidates of the modified merge candidate list is less than the maximum merge candidate number, the modified merge candidate which is derived based on the refine merge candidate may be added to the modified merge candidate list. The motion vector of the modified merge candidate may be derived as the sum of the motion vector of the refine merge candidate and a delta motion vector. The motion vector of the modified merge candidate may be derived based on foregoing Equation 8.

The encoding device derives the motion information of the current block based on the modified merge candidate list (S2330). The encoding device may select one merge candidate from among the merge candidates of the modified merge candidate list, and may derive, as the motion information of the current block, the motion information which the selected merge candidate represents. The encoding device may generate a merge index which indicates the merge candidate selected from among the merge candidates included in the modified merge candidate list. The merge index may be included in the information on the inter-prediction.

The encoding device performs prediction of the current block based on the motion information (S2340). The prediction block of the current block may be derived based on the motion information, and the reconstructed block may be derived based on the prediction block. Specifically, the encoding device may derive the reference block in the reference picture based on the motion information. The motion information may include a motion vector and a reference picture index. The encoding device may derive, as the reference picture of the current block, the reference picture among the reference pictures of the reference picture list, which the reference picture index indicates, and may derive, as the reference block of the current block, the block in the reference picture, which the motion vector indicates. The encoding device may generate the prediction sample based on the reference block.

Further, the encoding device may generate the residual sample based on the original sample and the generated prediction sample. The encoding device may generate the information on the residual based on the residual sample. The information on the residual may include transform coefficients relating to the residual sample. The encoding device may derive the reconstruction sample based on the prediction sample and the residual sample. That is, the encoding device may derive the reconstruction sample by adding the prediction sample to the residual sample. Further, the encoding device may encode the information on the residual and output the encoded information in the form of a bitstream. The bitstream may be transmitted to the decoding device through a network or a storage medium.

The encoding device encodes the information on the inter-prediction of the current block (S2350). In a case where the merge mode is applied to the current block, the encoding device may generate the merge index which indicates the merge candidate selected for deriving the motion information of the current block. The encoding device may encode the merge index and output the encoded merge index. The merge index may be included in the information on the inter-prediction. Further, the encoding device may generate the information on the residual based on the residual sample. The information on the residual may include transform coefficients relating to the residual sample. The encoding device may encode the information on the residual and output the encoded information in the form of a bitstream. The bitstream may be transmitted to the decoding device through a network or a storage medium.

Figure 24:
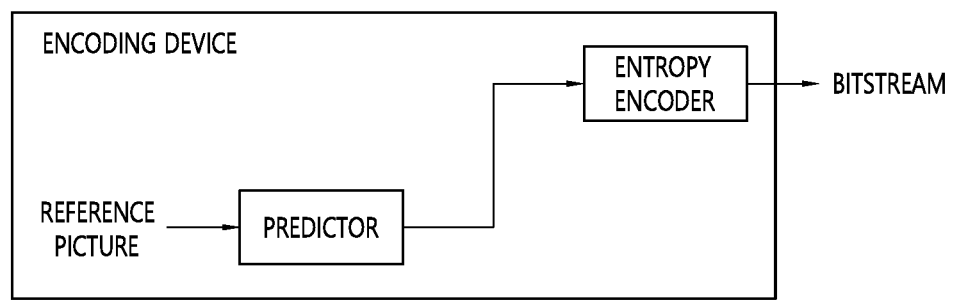
FIG. 24 schematically represents an encoding device performing an image encoding method according to the present disclosure.

FIG. 24 schematically represents an encoding device performing an image encoding method according to the present disclosure. The method disclosed in FIG. 23 may be performed by the encoding device disclosed in FIG. 24. Specifically, for example, the predictor of the encoding device of FIG. 24 may perform S2300 to S2340 of FIG. 23, and the entropy encoder of the encoding device may perform S2350 of FIG. 23.

Figure 25:
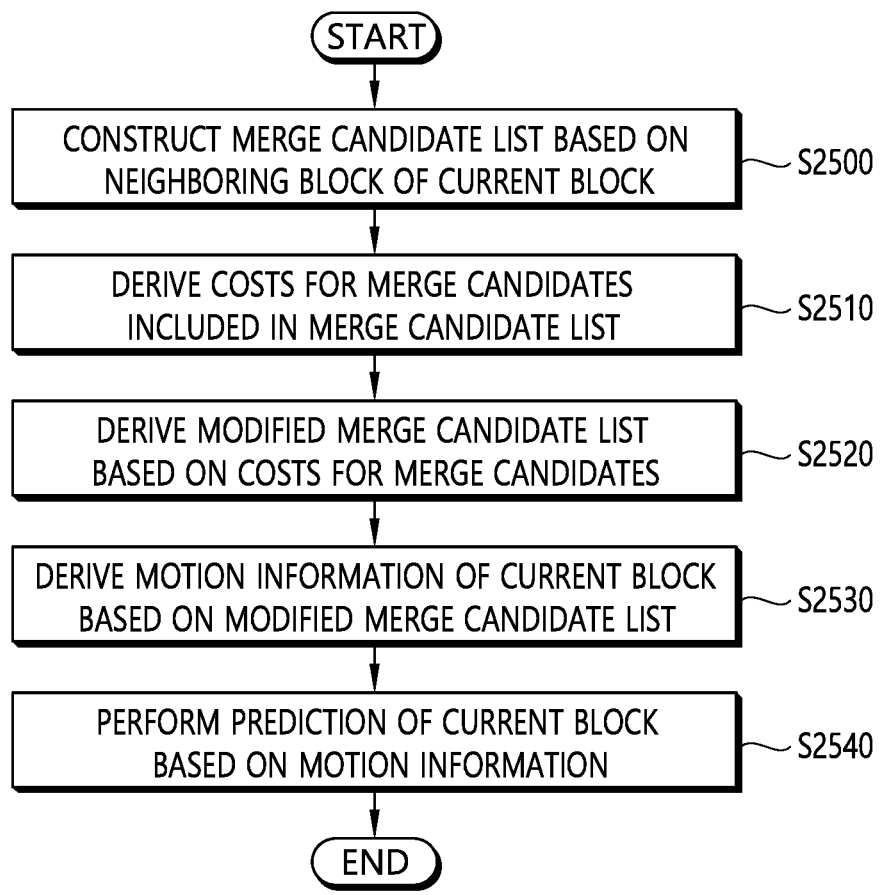
FIG. 25 schematically represents an image decoding method by a decoding device according to the present disclosure.

FIG. 25 schematically represents an image decoding method by a decoding device according to the present disclosure. The method disclosed in FIG. 25 may be performed by the decoding device disclosed in FIG. 2. Specifically, for example, S2500 to S2540 of FIG. 25 may be performed by the predictor of the decoding device.

The decoding device constructs the merge candidate list based on the neighboring block of the current block (S2500). The decoding device may derive the motion information of the neighboring block as the merge candidate, and may construct the merge candidate list including the merge candidate. Further, the decoding device may derive, as the merge candidate of the current block, the motion information derived by combining the motion informations of the neighboring blocks, and may construct the merge candidate list including the merge candidate. Here, the neighboring block may include the spatial neighboring block and the temporal neighboring block. The spatial neighboring block may include the left neighboring block, the top neighboring block, the top-left neighboring block, the bottom-left neighboring block, and the top-right neighboring block of the current block, and the temporal neighboring block may include the co-located block including a position in the reference picture corresponding to the bottom-right position or central position of the current block, and the co-located block indicated by the motion information of the predetermined neighboring block of the current block. If a size of the current block is W×H, and an x component of the top-left sample position of the current block is 0 and a y component thereof is 0, the left neighboring block may be a block including a top-left sample at coordinates $(-1, H-1)$; the top neighboring block, a block including a top-left sample at coordinates $(W-1, -1)$; the top-right neighboring block, a block including a top-left sample at coordinates $(W, -1)$; the bottom-left neighboring block, a block including a top-left sample at coordinates $(-1, H)$; and the top-left neighboring block, a block including a top-left sample at coordinates $(-1, -1)$.

Further, the decoding device may construct the merge candidate list including merge candidates of the maximum candidate number based on the neighboring block. For example, the maximum candidate number may be seven. Further, for example, the merge candidate list may be constructed in the order of foregoing Table 1.

Meanwhile, the decoding device may obtain information on the inter-prediction of the current block through the bitstream. The information on the inter-prediction may represent which one mode of a skip mode, a merge mode, and an adaptive motion vector prediction (AMVP) mode is applied to the current block. In a case where the skip mode or the merge mode is applied to the current block, the decoding device may construct the merge candidate list based on the neighboring block of the current block, and may obtain the merge index indicating one merge candidate of the merge candidates included in the merge candidate list.

The decoding device may derive the costs for the merge candidates included in the merge candidate list (S2510). The decoding device may derive the costs for the merge candidates.

For example, the cost of the merge candidate may be derived as the sum of absolute differences (SAD) between the template of the current block and the template of the merge candidate. That is, the cost may be derived as the sum of absolute differences (SAD) between the corresponding samples of the template of the current block and the template of the merge candidate. The cost may be derived based on foregoing Equation 1.

Here, the template of the current block may include a top template and a left template, and the cost may be derived as the sum of the top cost and the left cost. The top cost may be derived as the SAD between the top template of the current block and the top template of the merge candidate, and the left cost may be derived as the SAD between the left template of the current block and the left template of the merge candidate. Alternatively, the top cost may be derived as the value obtained by normalizing the SAD between the top template of the current block and the top template of the merge candidate with the size of the top template, and the left cost may be derived as the value obtained by normalizing the SAD between the left template of the current block and the left template of the merge candidate with the size of the left template. The left cost and the top cost may be derived based on foregoing Equation 5. Alternatively, the top cost may be derived as the value obtained by upscaling the SAD between the top template of the current block and the top template of the merge candidate and normalizing the upscaled SAD with the size of the top template, and the left cost may be derived as the value obtained by upscaling the SAD between the left template of the current block and the left template of the merge candidate and normalizing the upscaled SAD with the size of the left template. The left cost and the top cost may be derived based on foregoing Equation 6.

When a size of the current block is W×H, and an x component of a top-left sample position of the current block is 0 and a y component thereof is 0, the template of the current block may include a top-left sample at coordinates (−n, 0), may include the left template having a size of n×H and a top-left sample at (0, −n), and may be derived as the top template having a size of W×n. Here, the n may represent the value which the size information on the template represents. The decoding device may obtain size information on the template through the bitstream.

Alternatively, the template of the current block may be variable according to the neighboring block for the merge candidate. For example, when a size of the current block is W×H, and an x component of a top-left sample position of the current block is 0 and a y component thereof is 0, the template of the current block for a merge candidate indicating motion information of the top neighboring block may include a top-left sample at coordinates (−n, 0), may include the left template having a size of n×H and a top-left sample at (−n, −n), and may be derived as the top template having a size of (n+W−1)×n. Further, the template of the current block for a merge candidate indicating motion information of the left neighboring block may include a top-left sample at coordinates (−n, −n), may include the left template having a size of n×(n+H−1) and a top-left sample at coordinates (0, −n), and may be derived as the top template having a size of W×n. Further, when a size of the current block is W×H, and an x component of a top-left sample position of the current block is 0 and a y component thereof is 0, the template of the current block for a merge candidate other than a merge candidate indicating motion information of the top neighboring block and a merge candidate indicating motion information of the left neighboring block may include a top-left sample at coordinates (−n, 0), may include the left template having a size of n×H and a top-left sample at (0, −n), and may be derived as the top template having a size of W×n. Here, the n may represent the value which the size information on the template represents. The decoding device may obtain size information on the template through the bitstream.

Meanwhile, as another example, the cost of the merge candidate may be derived as the sum of absolute differences (SAD) between the L0 reference block of the merge candidate and the L1 reference block of the merge candidate. That is, the cost may be derived as the sum of absolute differences (SAD) between the corresponding samples of the L0 reference block and the L1 reference block. Here, the L0 reference block may be a reference block which L0 motion information of the merge candidate indicates, and the L1 reference block may be a reference block which L1 motion information of the merge candidate indicates.

Meanwhile, when the merge candidate is uni-prediction motion information including L0 motion information, the motion information that indicates a reference block among reference blocks within a search range, which has a minimum cost with the L0 reference block which the L0 motion information indicates, may be derived as the L1 motion information. After this, the cost of the merge candidate may be derived as the cost between the L0 reference block and the L1 reference block which the L1 motion information indicates. Here, the search range may be a 1-integer-pel range around a position which the L0 motion information indicates. Alternatively, the search range may be a 2-integer-pel range around a position which the L0 motion information indicates. Alternatively, the search range may be a half-integer-pel range around a position which the L0 motion information indicates. Further, the search range may be set as a range other than the above-described examples.

Further, when the merge candidate is uni-prediction motion information including L1 motion information, the motion information that indicates a reference block among reference blocks within a search range, which has a minimum cost with the L1 reference block which the L1 motion information indicates, may be derived as the L0 motion information. After this, the cost of the merge candidate may be derived as the cost between the L1 reference block and the L0 reference block which the L0 motion information indicates. Here, the search range may be a 1-integer-pel range around a position which the L1 motion information indicates. Alternatively, the search range may be a 2-integer-pel range around a position which the L1 motion information indicates. Alternatively, the search range may be a half-integer-pel range around a position which the L1 motion information indicates. Further, the search range may be set as a range other than the above-described examples.

The decoding device derives the modified merge candidate list based on the costs for the merge candidates (S2520).

For example, the decoding device may derive the reordered merge candidate list by reordering the merge candidates in an order from small to large costs thereof, may derive the refine merge candidate based on a predetermined merge candidate of the merge candidates, and may derive the modified merge candidate list by adding the refine merge candidate to the reordered merge candidate list.

Alternatively, the decoding device may derive the modified merge candidate list by reordering the merge candidates in an order from small to large costs thereof. Alternatively, the decoding device may derive the refine merge candidate based on a predetermined merge candidate of the merge candidates of the merge candidate list, and may derive the modified merge candidate list by adding the refine merge candidate to the merge candidate list.

Meanwhile, the merge candidates may be derived as the predetermined merge candidate in the reordered order. Alternatively, the merge candidate among the merge candidates which has the smallest cost may be derived as the predetermined merge candidate.

Specifically, the refine merge candidate may be derived as follows.

For example, the decoding device may derive, from among templates of reference blocks within a search range, the template which has the smallest cost with the template of the current block, and may derive, as the refine merge candidate, the motion information which indicates the reference block of the derived template. Here, the search range may be a 1-integer-pel range around a position which motion information represented by the predetermined merge candidate indicates. Alternatively, the search range may be a 2-integer-pel range around a position which the motion information indicates. Alternatively, the search range may be a half-integer-pel range around a position which the motion information indicates. Further, the search range may be set as a range other than the above-described examples.

As another example, the decoding device may derive an L0 reference block and an L1 reference block among L0 reference blocks within an L0 search range and L1 reference blocks within an L1 search range, which have the smallest sum of absolute differences (SAD), as a refine L0 reference block and a refine L1 reference block, and may derive, as refine merge candidates, L0 motion information indicating the refine L0 reference block and L1 motion information indicating the refine L1 reference block. Here, the L0 search range may be a 1-integer-pel range around a position which the L0 motion information of the predetermined merge candidate indicates, and the L1 search range may be a 1-integer-pel range around a position which the L1 motion information of the predetermined merge candidate indicates. Alternatively, the L0 search range may be a 2-integer-pel range around a position which the L0 motion information indicates, and the L1 search range may be a 2-integer-pel range around a position which the L1 motion information indicates. Alternatively, the L0 search range may be a half-integer-pel range around a position which the L0 motion information indicates, and the L1 search range may be a half-integer-pel range around a position which the L1 motion information indicates. Further, the search range may be set as a range other than the above-described examples.

As another example, the refine merge candidate may be derived as the merge candidate including a local illumination compensation (LIC) flag which has an opposite value to a value of an LIC flag of the predetermined merge candidate. The LIC flag may represent whether the LIC is applied to the current block. For example, in a case where the value of the LIC flag of the predetermined merge candidate is 1, the refine merge candidate may include the LIC flag of which value is 0. In a case where the value of the LIC flag of the predetermined merge candidate is 0, the refine merge candidate may include the LIC flag of which value is 1.

The refine merge candidate may be added to the modified merge candidate list in such an order that it comes before the predetermined merge candidate. Meanwhile, in a case where the refine merge candidate is added to the modified merge candidate list, the merge candidates of the modified merge candidate list may be reordered. For example, in a case where the refine merge candidate is a merge candidate which is first in order in the modified merge candidate list, the merge candidates other than the refine merge candidate may be reordered in an order of the merge candidate list.

Meanwhile, the decoding device may determine whether a merge candidate of the modified merge candidate list represents the same motion information as a merge candidate that comes in order before it. In a case where the merge candidate represents the same motion information as the merge candidate that comes in order before it, the merge candidate may be removed from the modified merge candidate list. The decoding device may make the determination for all the merge candidates of the modified merge candidate list as to whether one of them represents the same motion information as another one that comes in order before the one. Alternatively, the decoding device may make the determination for the refine merge candidate as to whether it indicates the same motion information as a merge candidate that comes in order before it. Alternatively, the decoding device may make the determination for the reordered merge candidate as to whether it indicates the same motion information as a merge candidate that comes in order before it. Here, the reordered merge candidate may be a merge candidate whose order in the merge candidate list is different from that in the reordered merge candidate list.

Meanwhile, in a case where the number of the merge candidates of the modified merge candidate list is greater than the maximum merge candidate number, the merge candidate for the largest cost may be removed from the modified merge candidate list. Alternatively, in a case where the number of the merge candidates of the modified merge candidate list is greater than the maximum merge candidate number, the last merge candidate in the merge candidate list may be removed from the modified merge candidate list. Alternatively, in a case where the number of the merge candidates of the modified merge candidate list is greater than the maximum merge candidate number, the predetermined merge candidate for the refine merge candidate may be removed from the modified merge candidate list.

Meanwhile, in a case where the number of the merge candidates of the modified merge candidate list is less than the maximum merge candidate number, the merge candidate which is derived based on a merge candidate reordered in a different order from that of the merge candidate list may be added to the modified merge candidate list. Alternatively, in a case where the number of the merge candidates of the modified merge candidate list is less than the maximum merge candidate number, the merge candidate representing a zero vector may be added to the modified merge candidate list. Alternatively, in a case where the number of the merge candidates of the modified merge candidate list is less than the maximum merge candidate number, the modified merge candidate which is derived based on the refine merge candidate may be added to the modified merge candidate list. The motion vector of the modified merge candidate may be derived as the sum of the motion vector of the refine merge candidate and a delta motion vector. The motion vector of the modified merge candidate may be derived based on foregoing Equation 8.

The decoding device derives the motion information of the current block based on the modified merge candidate list (S2530). The decoding device may select one merge candidate from among the merge candidates of the merge candidate list, and may derive, as the motion information of the current block, the motion information which the selected merge candidate represents. Specifically, for example, the decoding device may obtain, through the bitstream, a merge index which indicates one merge candidate among the merge candidates included in the modified merge candidate list. The merge index may be included in the information on the inter-prediction. The decoding device may derive, as the motion information of the current block, the motion information of the merge candidate among the merge candidates of the modified merge candidate list, which the merge index indicates.

The decoding device performs prediction of the current block based on the motion information (S2540). The prediction block of the current block may be derived based on the motion information, and the reconstructed block may be derived based on the prediction block. Specifically, the decoding device may derive the reference block in the reference picture based on the motion information. The motion information may include a motion vector and a reference picture index. The decoding device may derive, as the reference picture of the current block, the reference picture among the reference pictures of the reference picture list, which the reference picture index indicates, and may derive, as the reference block of the current block, the block in the reference picture, which the motion vector indicates. The decoding device may generate the prediction sample based on the reference block, and may use a prediction sample directly as the reconstruction sample according to prediction mode, or may generate the reconstruction sample by adding a residual sample to the prediction sample. If there is a residual sample for the current block, the decoding device may receive information on residual for the current block from the bitstream. The information on residual may include a transform coefficient relating to the residual sample. The decoding device may derive the residual sample (or residual sample array) for the current block based on the residual information. The decoding device may generate the reconstruction sample based on the prediction sample and the residual sample, and may derive a reconstructed block or reconstructed picture based on the reconstruction sample. After this, as described above, the decoding device may apply an in-loop filtering procedure such as an SAO procedure and/or deblocking filtering to the reconstructed picture in order to improve subjective/objective video quality as needed.

Figure 26:
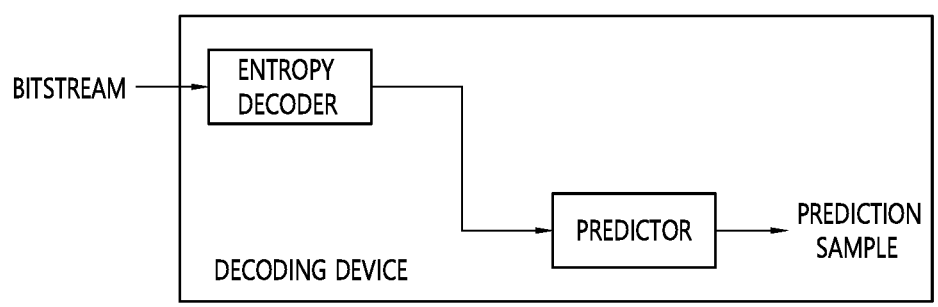
FIG. 26 schematically represents a decoding device performing an image decoding method according to the present disclosure.

FIG. 26 schematically represents a decoding device performing an image decoding method according to the present disclosure. The method disclosed in FIG. 25 may be performed by the decoding device disclosed in FIG. 26. Specifically, for example, the predictor of the encoding device of FIG. 26 may perform S2500 to S2540 of FIG. 25. Meanwhile, the merge index, the information on the inter-prediction and/or information on the residual may be obtained from the bitstream by an entropy decoder of the decoding device disclosed in FIG. 26.

According to the above-described present disclosure, taking the cost into consideration, optimal merge candidates for the current block may be reordered in an order from small to large values of merge indexes, through which it is possible to reduce a bit amount for prediction and improve an overall coding efficiency.

Further, according to the present disclosure, a refine merge candidate, which is an optimal merge candidate, can be derived based on a merge candidate of a current block, through which it is possible to improve prediction accuracy and efficiency, and improve an overall coding efficiency.

Further, according to the present disclosure, a merge candidate list for a current block, which has been more efficiently modified by taking characteristics of the current block into consideration, can be derived, through which it is possible to improve prediction accuracy and prediction efficiency, and improve an overall coding efficiency.

In the above-described embodiments, the methods are explained based on flowcharts by means of a series of steps or blocks, but the present disclosure is not limited to the order of steps, and a certain step may occur in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the disclosure may be implemented as a software form, and an encoding device and/or decoding device according to the disclosure may be included in a device for image processing, such as, a TV, a computer, a smartphone, a set-top box, a display device or the like.

When embodiments in the disclosure are embodied by a software, the above-described methods may be embodied as modules (processes, functions or the like) to perform the above-described functions. The modules may be stored in a memory and may be executed by a processor. The memory may be inside or outside the processor and may be connected to the processor via a well-known various means. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding device and the encoding device to which the present disclosure is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Also, a content streaming system to which the present disclosure is applied may include an encoding server, a streaming server, a web server, a media storage, a user device, and a multimedia input device.

The encoding server compresses content input from multimedia input devices, such as smartphones, cameras, camcorders, and so on, into digital data to generate a bitstream and transmit the bitstream to the streaming server. As another example, when multimedia input devices, such as smartphones, cameras, camcorders, and so on, directly generate a bitstream, the encoding server may be omitted. The bitstream may be generated by an encoding method or a bitstream generating method to which the present disclosure is applied, and the streaming server may temporarily store the bitstream in the process of transmitting or receiving the bitstream.

The streaming server transmits multimedia data to the user device based on a user request through the web server, and the web server serves as an intermediary for informing the user of what services are provided. When a user requests a desired service from the web server, the web server delivers it to a streaming server, and the streaming server transmits multimedia data to the user. Here, the content streaming system may include a separate control server, and, in this case, the control server controls a command/response between devices in the content streaming system.

The streaming server may receive content from a media repository and/or an encoding server. For example, when content is received from the encoding server, the content may be received in real time. In this case, in order to provide a smooth streaming service, the streaming server may store the bitstream for a predetermined time.

Examples of the user device include a mobile phone, a smartphone, a laptop computer, a digital broadcasting terminal, a personal digital assistant (PDA), a portable multimedia player (PMP), a navigation device, and a slate PC, a tablet PC, ultrabook, a wearable device (e.g., smartwatch, glass glasses, head mounted display), a digital TV, a desktop computer, a digital signage, and so on. Each server in the content streaming system may operate as a distributed server, and in this case, data received from each server may be processed in a distributed manner.

What is claimed is:

1. An image decoding method performed by a decoding device, the method comprising:
   constructing a merge candidate list based on a neighboring block of a current block;
   deriving costs for merge candidates included in the merge candidate list;
   deriving a modified merge candidate list based on the costs for the merge candidates;
   deriving motion information of the current block based on the modified merge candidate list; and
   performing prediction of the current block based on the motion information,
   wherein the neighboring block includes a spatial neighboring block and a temporal neighboring block, and
   wherein the deriving of the modified merge candidate list based on the costs for the merge candidates includes:
   deriving a reordered merge candidate list by reordering the merge candidates in an order from small to large costs thereof;
   deriving a refine merge candidate based on a predetermined merge candidate among the merge candidates; and
   deriving the modified merge candidate list by adding the refine merge candidate to the reordered merge candidate list.

2. The image decoding method of claim 1, wherein a cost of a merge candidate is derived as the sum of absolute differences (SAD) between a template of the current block and a template of the merge candidate.

3. The image decoding method of claim 2, wherein the template of the current block includes a top template and a left template,
   the cost is derived as the sum of a top cost and a left cost,
   the top cost is derived as the SAD between the top template of the current block and a top template of the merge candidate, and
   the left cost is derived as the SAD between the left template of the current block and a left template of the merge candidate.

4. The image decoding method of claim 3, wherein size information on the template of the current block is received,
   based on a case that a size of the current block is W×H, and an x component of a top-left sample position of the current block is 0 and a y component thereof is 0, the template of the current block includes a top-left sample at coordinates (−n, 0), includes the left template having a size of n×H and a top-left sample at coordinates (0, −n), and is derived as the top template having a size of W×n, and
   the n is a value which the size information represents.

5. The image decoding method of claim 3, wherein the template of the current block is variable according to a neighboring block for the merge candidate.

6. The image decoding method of claim 5, wherein the spatial neighboring block includes a left neighboring block and a top neighboring block of the current block,
   based on a case that a size of the current block is W×H, and an x component of a top-left sample position of the current block is 0 and a y component thereof is 0, the template of the current block for a merge candidate representing motion information of the top neighboring block includes a top-left sample at coordinates (−n, 0), includes the left template having a size of n×H and a top-left sample at (−n, −n), and is derived as the top template having a size of (n+W−1)×n, and
   the template of the current block for a merge candidate representing motion information of the left neighboring block includes a top-left sample at coordinates (−n, −n), includes the left template having a size of n×(n+H−1) and a top-left sample at coordinates (0, −n), and is derived as the top template having a size of W×n.

7. The image decoding method of claim 1, wherein a cost of a merge candidate is derived as the sum of absolute differences (SAD) between a first reference block of the merge candidate and a second reference block of the merge candidate, and
   the first reference block is a reference block which a first motion information using a first reference picture list of the merge candidate is related to, and the second reference block is a reference block which a second motion information using a second reference picture list of the merge candidate is related to.

8. The image decoding method of claim 7, wherein based on a case that the merge candidate includes the second motion information as uni-prediction motion information, motion information that is related to a reference block among reference blocks within a search range, which has a minimum cost with the second reference block which the seconder motion information is related to, is derived as the first motion information.

9. The image decoding method of claim 8, wherein the search range is a 1-integer-pel range around a position which the second motion information is related to.

10. The image decoding method of claim 1, wherein the deriving of the refine merge candidate based on the predetermined merge candidate among the merge candidates includes:
deriving a template among templates of reference blocks within a search range, which has a smallest cost with the template of the current block; and
deriving motion information, which is related to a reference block of the derived template, as the refine merge candidate,
wherein the search range is a 1-integer-pel range around a position which motion information represented by the predetermined merge candidate is related to.

11. The image decoding method of claim 1, wherein the deriving of the refine merge candidate based on the predetermined merge candidate among the merge candidates includes:
deriving, as a first refine reference block and a second refine reference block, a first reference block and a second reference block among first reference blocks within a first search range and second reference blocks within a second search range, which have the smallest sum of absolute differences (SAD); and
deriving, as refine merge candidates, a first motion information related to the first refine reference block and a second motion information related to the second refine reference block, and
wherein the first search range is a 1-integer-pel range around a position which a first motion information using a first reference picture list of the predetermined merge candidate is related to, and
wherein the second search range is a 1-integer-pel range around a position which a second motion information using a second reference picture list of the predetermined merge candidate is related to.

12. The image decoding method of claim 1, wherein the refine merge candidate is derived as a merge candidate including a location illumination compensation (LIC) flag which has an opposite value to that of an LIC flag of the predetermined merge candidate, and
the LIC flag represents whether the LIC is applied.

13. The image decoding method of claim 1, further comprising:

determining whether a reordered merge candidate of the modified merge candidate list represents the same motion information as a merge candidate that comes in order before it; and
removing the reordered merge candidate from the modified merge candidate list based on a case that the reordered merge candidate represents the same motion information as the merge candidate that comes in order before it.

14. A decoding device which performs image decoding, the device comprising:
an entropy decoder which obtains information on inter-prediction of a current block through a bitstream; and
a predictor which constructs a merge candidate list based on a neighboring block of the current block, derives costs for merge candidates included in the merge candidate list, derives a modified merge candidate list based on the costs for the merge candidates, derives motion information of the current block based on the modified merge candidate list and a merge index, and performs prediction of the current block based on the motion information,
wherein the neighboring block includes a spatial neighboring block and a temporal neighboring block, and the information on inter-prediction includes the merge index, and
wherein the predictor derives a reordered merge candidate list by reordering the merge candidates in an order from small to large costs thereof, derives a refine merge candidate based on a predetermined merge candidate among the merge candidates, and derives the modified merge candidate list by adding the refine merge candidate to the reordered merge candidate list.

15. An encoding device which performs image encoding, the device comprising:
a predictor which constructs a merge candidate list based on a neighboring block of a current block, derives costs for merge candidates included in the merge candidate list, derives a modified merge candidate list based on the costs for the merge candidates, determines motion information of the current block based on the modified merge candidate list, and performs prediction of the current block based on the motion information; and
an entropy encoder which encodes information on inter-prediction of the current block,
wherein the neighboring block includes a spatial neighboring block and a temporal neighboring block, and the information on inter-prediction includes the merge index, and wherein the predictor derives a reordered merge candidate list by reordering the merge candidates in an order from small to large costs thereof, derives a refine merge candidate based on a predetermined merge candidate among the merge candidates, and derives the modified merge candidate list by adding the refine merge candidate to the reordered merge candidate list.

* * * * *